United States Patent
Kwon et al.

(10) Patent No.: US 10,659,281 B2
(45) Date of Patent: May 19, 2020

(54) METHOD AND APPARATUS FOR TRANSMITTING/RECEIVING A BROADCAST SIGNAL

(71) Applicant: LG ELECTRONICS INC., Seoul (KR)

(72) Inventors: Woosuk Kwon, Seoul (KR); Minsung Kwak, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 15/742,397

(22) PCT Filed: Jul. 8, 2016

(86) PCT No.: PCT/KR2016/007441
§ 371 (c)(1),
(2) Date: Jan. 5, 2018

(87) PCT Pub. No.: WO2017/007281
PCT Pub. Date: Jan. 12, 2017

(65) Prior Publication Data
US 2018/0198671 A1    Jul. 12, 2018

Related U.S. Application Data

(60) Provisional application No. 62/209,900, filed on Aug. 26, 2015, provisional application No. 62/204,407, (Continued)

(51) Int. Cl.
*H01L 29/08* (2006.01)
*H04L 29/06* (2006.01)
(Continued)

(52) U.S. Cl.
CPC ........ *H04L 29/08018* (2013.01); *H04L 29/06* (2013.01); *H04L 29/08* (2013.01); *H04L 41/0226* (2013.01); *H04L 69/04* (2013.01); *H04L 69/08* (2013.01); *H04L 69/323* (2013.01); *H04N 21/234* (2013.01); *H04N 21/2362* (2013.01); *H04N 21/2383* (2013.01); *H04N 21/64322* (2013.01); *H04L 12/42* (2013.01); *H04L 69/324* (2013.01); *H04N 21/00* (2013.01)

(58) Field of Classification Search
None
See application file for complete search history.

(56) References Cited

U.S. PATENT DOCUMENTS

| | | | |
|---|---|---|---|
| 2013/0039278 A1 | 2/2013 | Bouazizi et al. | |
| 2013/0279380 A1* | 10/2013 | Hong | H04H 20/72 370/310 |
| 2016/0127522 A1* | 5/2016 | Yang | H04L 69/22 370/392 |

FOREIGN PATENT DOCUMENTS

| | | | |
|---|---|---|---|
| EP | 3229479 A1 | 10/2017 | |
| KR | 10-2013-0127990 A | 11/2013 | |
| (Continued) | | | |

*Primary Examiner* — Jutai Kao
(74) *Attorney, Agent, or Firm* — Dentons US LLP

(57) ABSTRACT

A method for transmitting a broadcast signal is disclosed. The method for transmitting a broadcast signal according to an embodiment of the present invention includes link layer processing IP/UDP data to output a link layer packet, and physical layer processing the link layer packet based on a PLP.

10 Claims, 44 Drawing Sheets

Related U.S. Application Data filed on Aug. 12, 2015, provisional application No. 62/189,754, filed on Jul. 8, 2015.

(51) Int. Cl.
| | |
|---|---|
| *H04N 21/234* | (2011.01) |
| *H04N 21/2383* | (2011.01) |
| *H04N 21/643* | (2011.01) |
| *H04N 21/2362* | (2011.01) |
| *H04L 12/24* | (2006.01) |
| *H04N 21/00* | (2011.01) |
| *H04L 12/42* | (2006.01) |
| *H04L 29/08* | (2006.01) |

(56) References Cited

FOREIGN PATENT DOCUMENTS

| KR | 10-2015-0068931 A | 6/2015 |
|---|---|---|
| WO | 2014/014305 A1 | 1/2014 |
| WO | 2014/189278 A1 | 11/2014 |
| WO | 2015/046836 A1 | 4/2015 |

\* cited by examiner

[Figure 1]
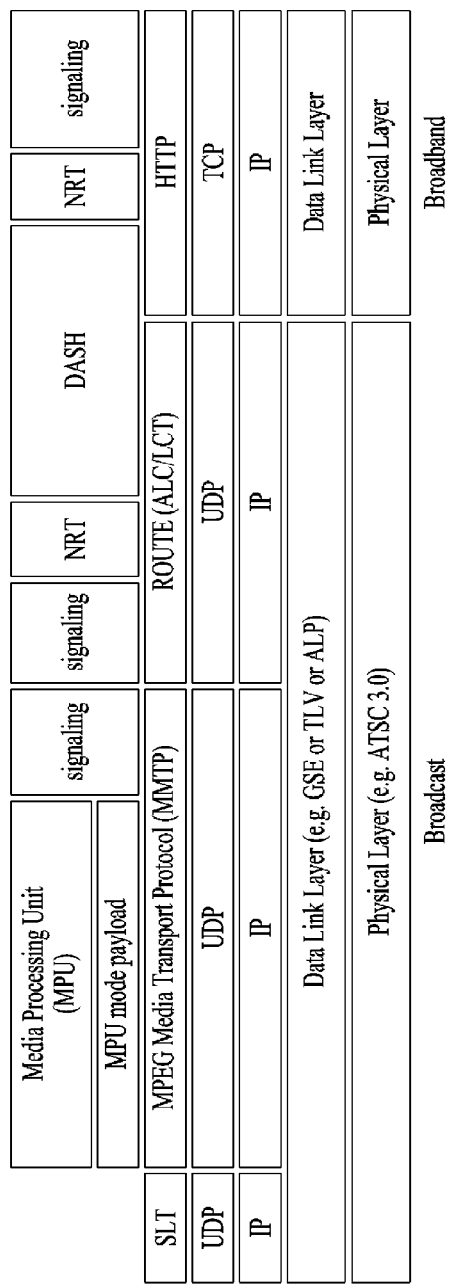

[Figure 2]
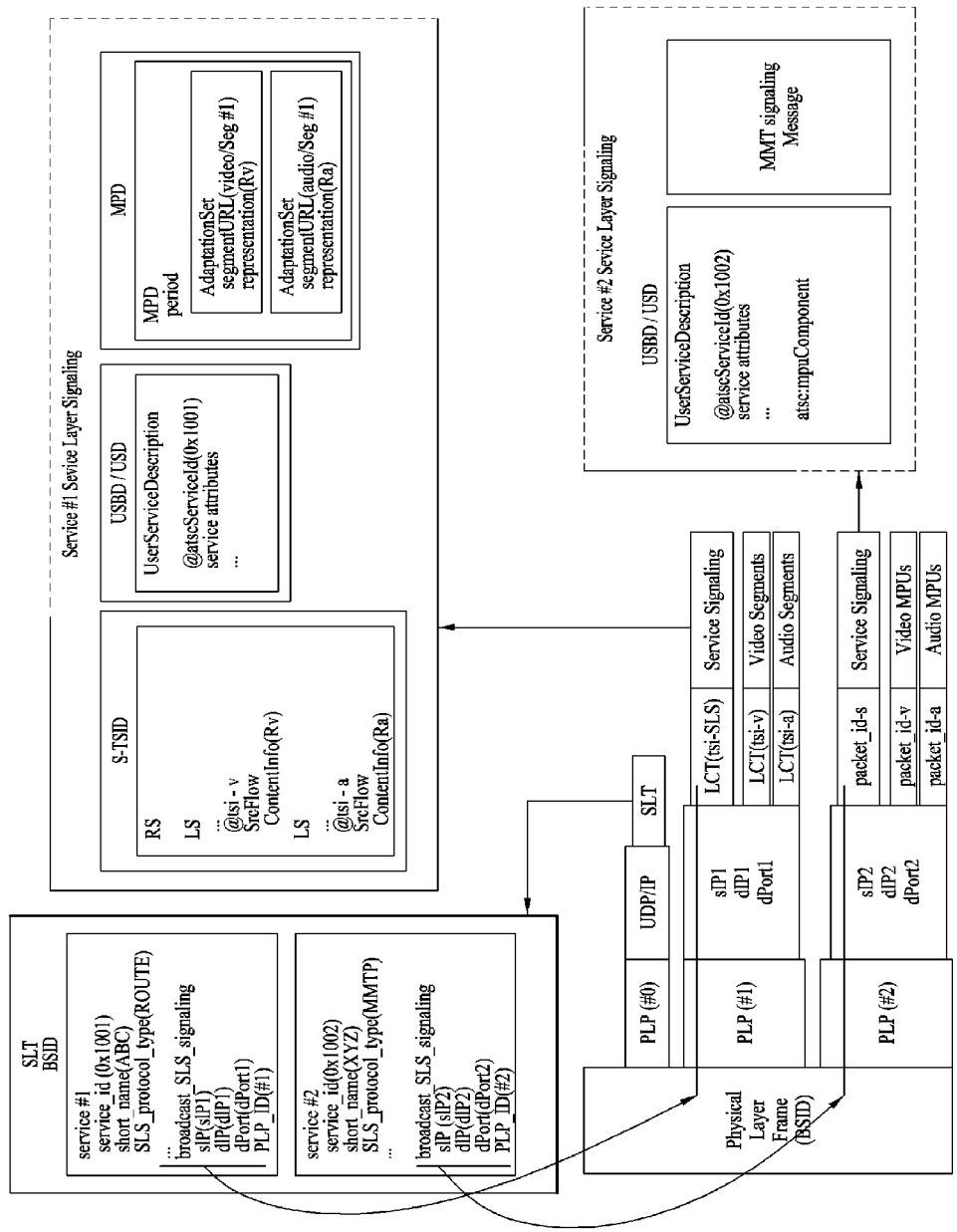

[Figure 3]

| Syntax | No. of Bits | Format |
|---|---|---|
| LLS_table( ) { | | |
|    LLS_table_id | 8 | uimsbf |
|    provider_id | 8 | uimsbf |
|    LLS_table_version | 8 | uimsbf |
|    switch (LLS_table_id) { | | |
|      case 0x01: | | |
|        SLT | var | Sec. 6.3 |
|        break; | | |
|      case 0x02: | | |
|        RRT | var | See Annex F |
|        break; | | |
|      case 0x03: | | |
|        System Time | var | Sec. 6.4 |
|        break; | | |
|      case 0x04: | | |
|        CAP | var | Sec. 6.5 |
|        break; | | |
|      default: | | |
|        reserved | var | |
|    } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcCignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

[Figure 4]

| Element or Attribute Name | | | | Use | Data Type |
|---|---|---|---|---|---|
| bundleDescription | | | | | |
|   userServiceDescription | | | | | |
| | @globalServiceID | | | 1 | anyURL |
| | @serviceID | | | 1 | unsignedShort |
| | @serviceStatus | | | 0..1 | boolean |
| | @fullMPDUri | | | 1 | anyURL |
| | @sTSIDUri | | | 1 | anyURL |
| | name | | | 0..N | string |
| | | @lang | | 1 | language |
| | serviceLanguage | | | 0..N | language |
| | capabilityCode | | | 0..1 | string |
| | deliveryMethod | | | 1..N | |
| | | broadcastAppService | | 1..N | |
| | | | basePattern | 1..N | string |
| | | unicastAppService | | 0..N | |
| | | | basePattern | 1..N | string | t4010

| Element or Attribute Name | | | Use | Data Type |
|---|---|---|---|---|
| S-TSID | | | | |
| | @serviceID | | 1 | unsignedShort |
| | RS | | 1..N | |
| | | @bsid | 0..1 | unsignedShort |
| | | @sIpAddr | 0..1 | string |
| | | @dIpAddr | 0..1 | string |
| | | @dport | 0..1 | unsignedShort |
| | | @PLPID | 0..1 | unsignedByte |
| | | LS | 1..N | |
| | |   @tsi | 1 | unsignedInt |
| | |   @PLPID | 0..1 | unsignedByte |
| | |   @bw | 0..1 | unsignedInt |
| | |   @startTime | 0..1 | dateTime |
| | |   @endTime | 0..1 | dateTime |
| | |   ScrFlow | 0..1 | scrFlowType |
| | |   RepairFlow | 0..1 | rprFlowType | t4020

[Figure 5]

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

[Figure 6]
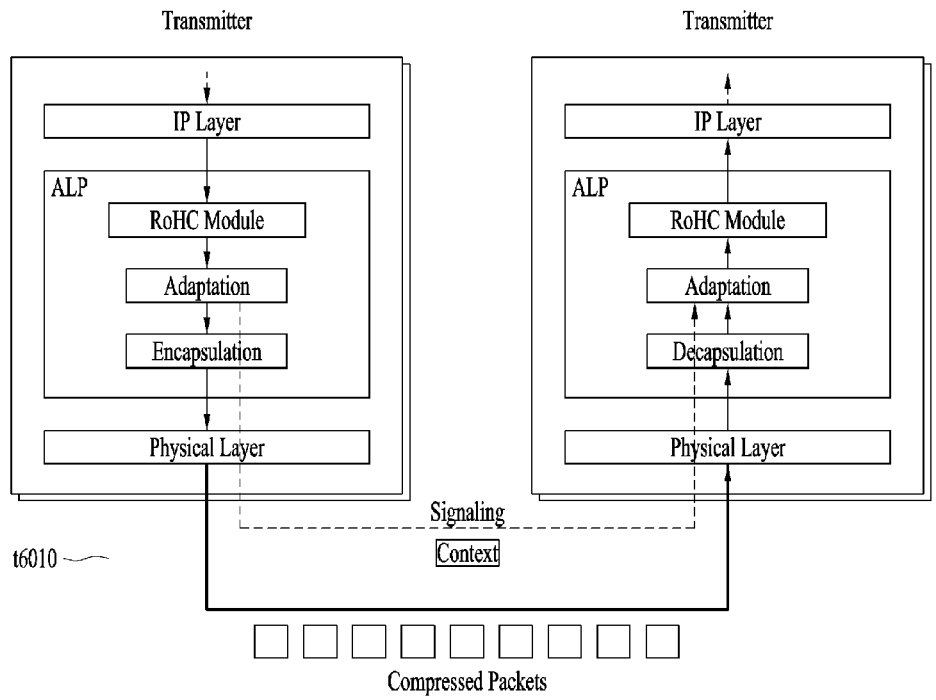
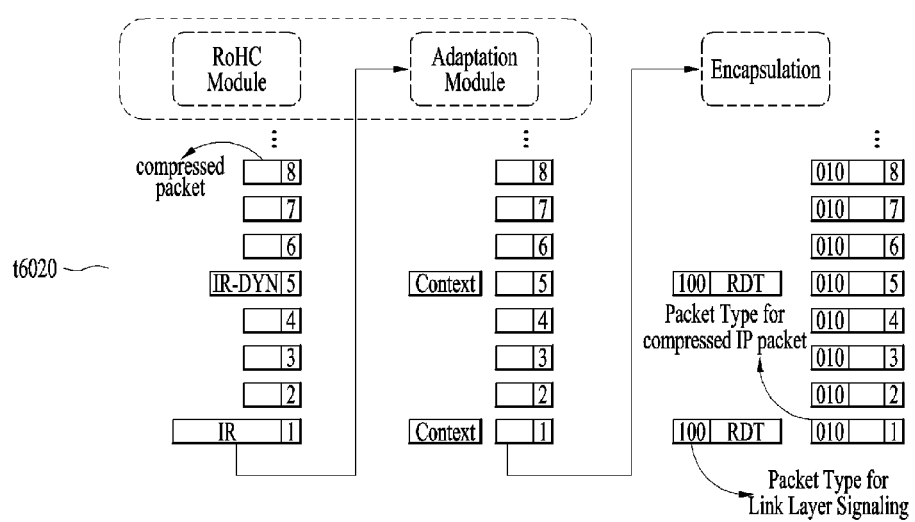

[Figure 7]

| Syntax | Number of bits | Format |
|---|---|---|
| Link_Mapping_Table() { | | |
|     signaling_type | 8 | 0x01 |
|     PLP_ID | 6 | uimsbf |
|     reserved | 2 | "11" |
|     num_session | 8 | uimsbf |
|     for(i = 0 ; i < num_session ; i + +) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '111111' |
|         if (SID_flag = = "1") { | | |
|             SID | 8 | uimsbf |
|         } | | |
|         if (compressed_flag = = "1') { | | |
|             context_id | 8 | uimsbf |
|         } | | |
|     } | | |
| } | | |

[Figure 8]
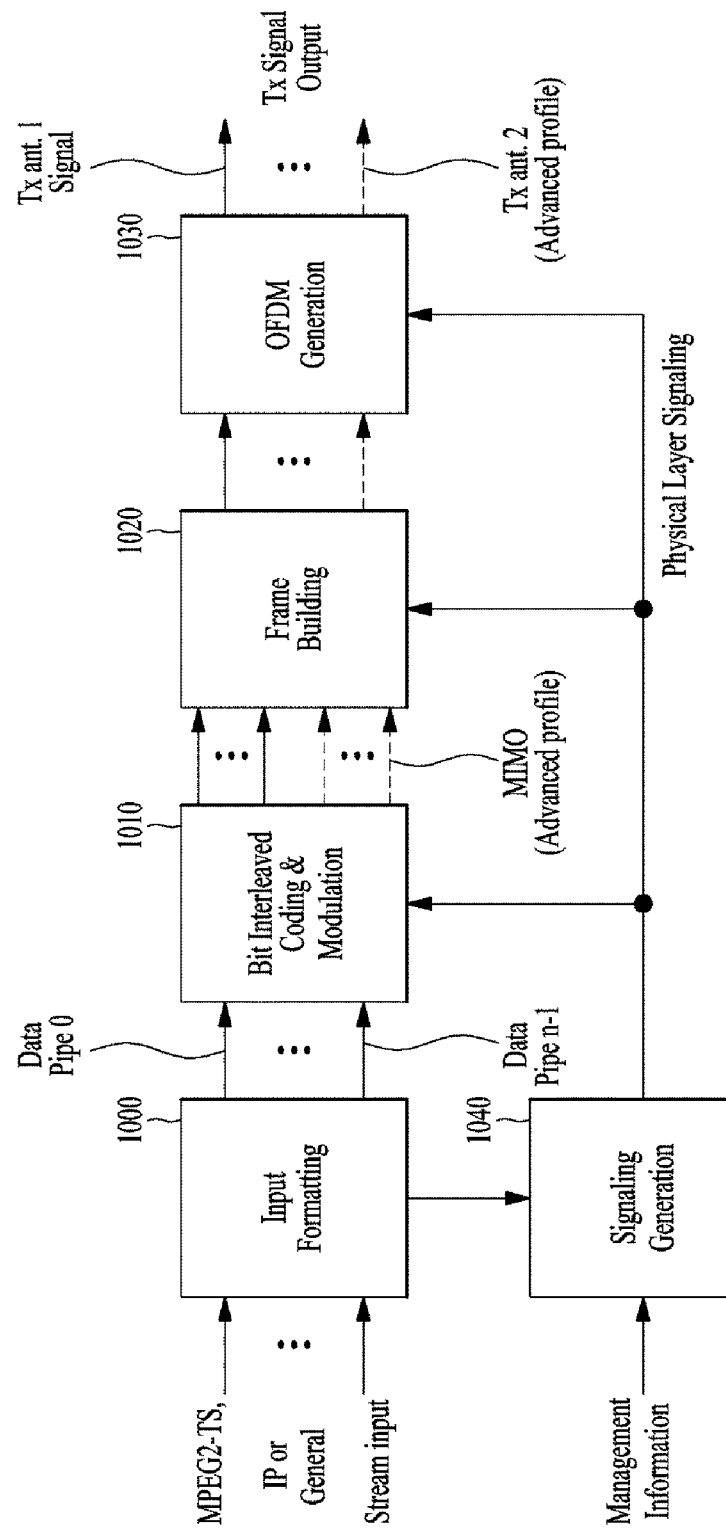

【Figure 9】

[Figure 10]
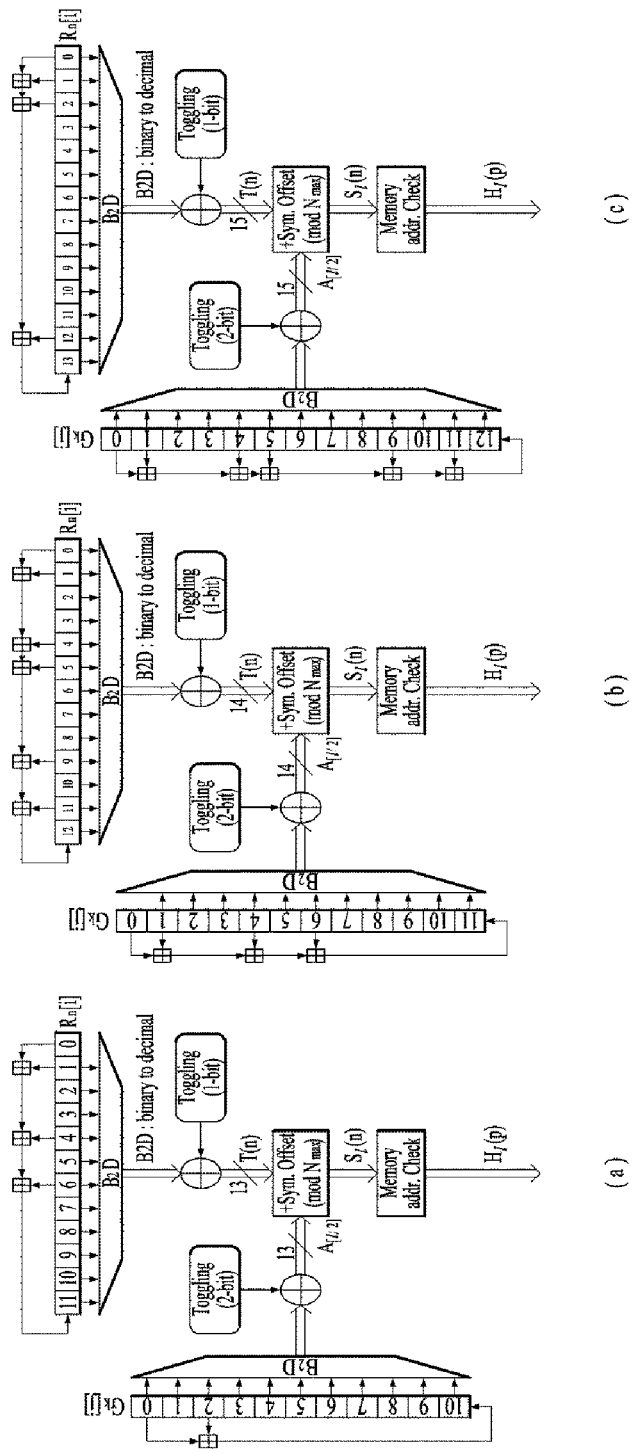

[Figure 11]

| Base header | Additional header | Optional header | Payload |
|---|---|---|---|

[Figure 12]
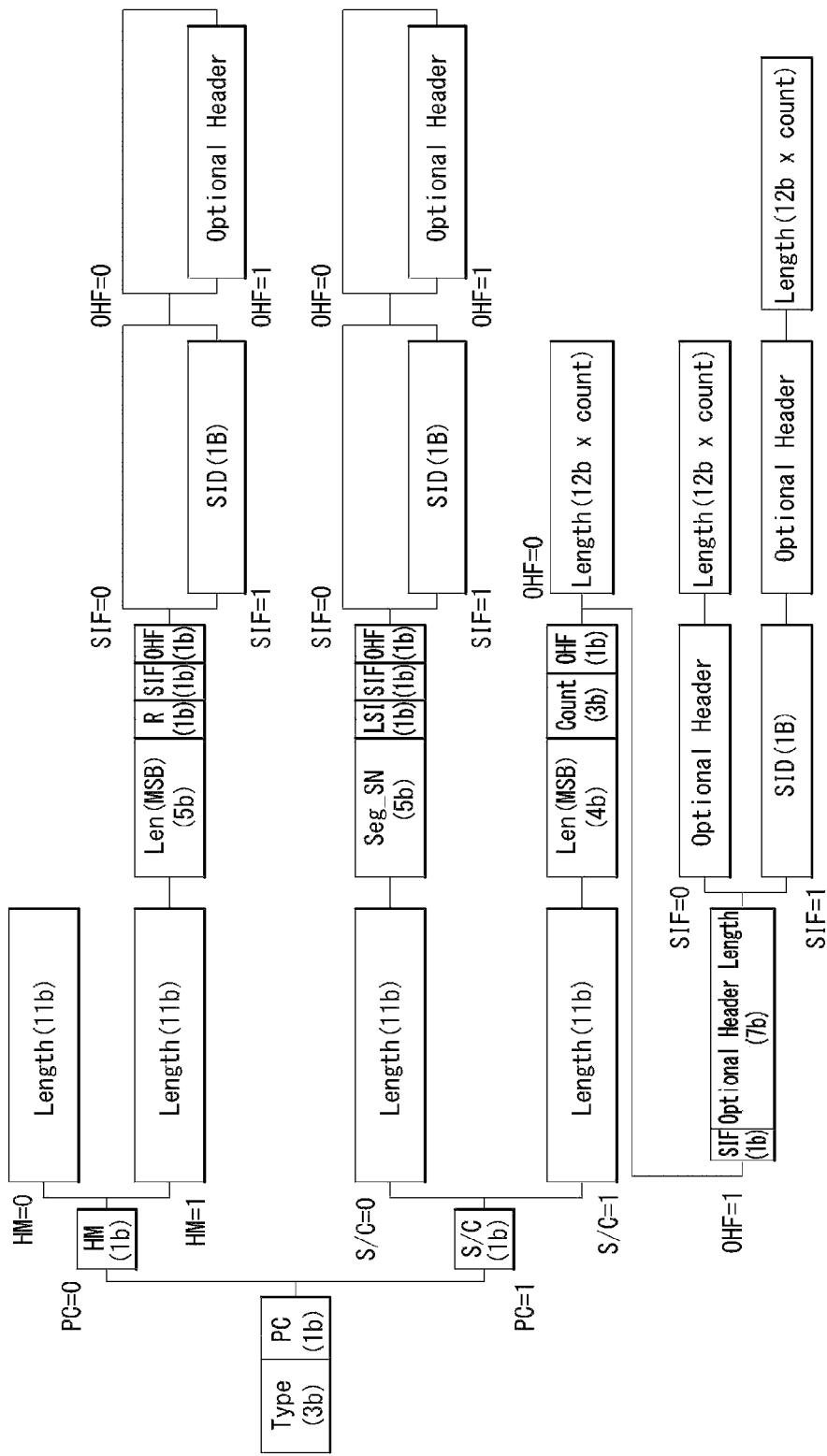

[Figure 13]
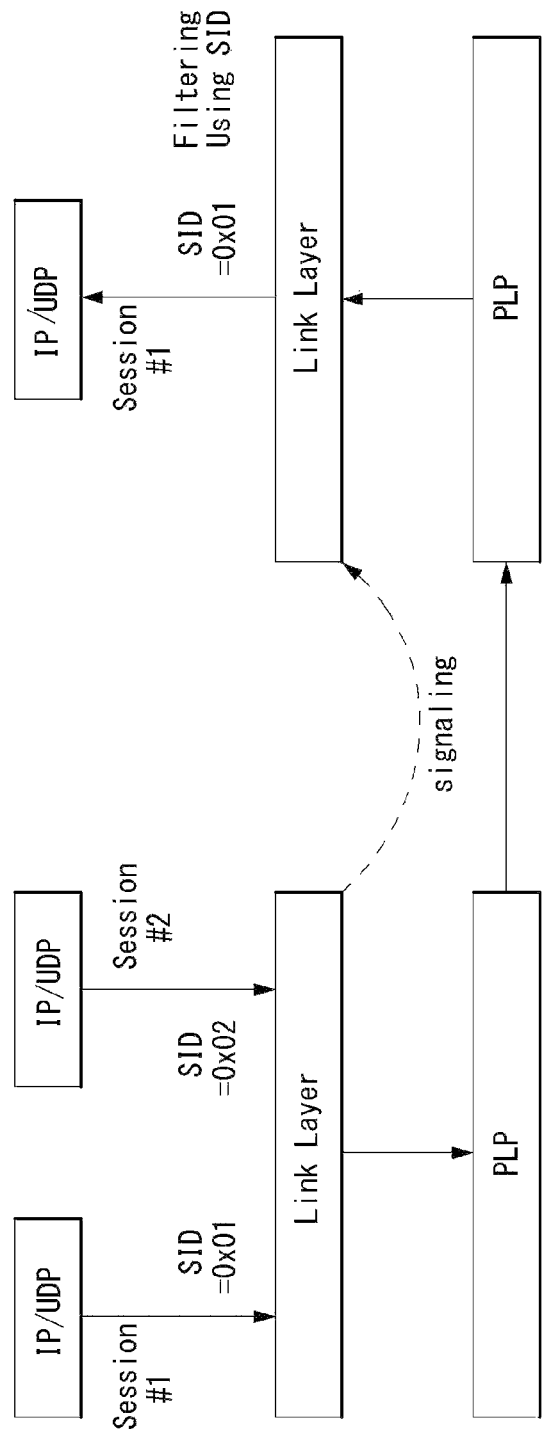

【Figure 14】

| Syntax | No. Bits | Format |
|---|---|---|
| Service_session_information() { | | |
|     num_services | 8 | |
|     for(i=0;i<num_services;i++){ | | |
|         service_id | 16 | |
|         service_session_info{ | | |
|             source_IP_address | 32 | |
|             destination_IP_address | 32 | |
|             destination_port_number | 16 | |
|             PLP_ID | 8 | |
|         } | | |
|     } | | |
| } | | |

(a)

| Syntax | No.Bits | Format |
|---|---|---|
| Sub_stream_mapping() { | | |
|     num_services | 8 | |
|     for(i=0;i<i<num_services;i++) { | | |
|         service_id | 16 | |
|         SID | 8 | |
|     } | | |
| } | | |

| 0 | | 1 | 2 | 3 |
|---|---|---|---|---|
| Version | IHL | Type of Service | Total Length | |
| Identification | | | IP Flags | Fragment Offset |
| Time To Live(TTL) | | Protocol | Header Checksum | |
| Source Address | | | | |
| Destination Address | | | | |

【Figure 16】

| 0 | 1 | 2 | 3 |
|---|---|---|---|
| Version | Traffic Class | Flow Label | |
| Payload Length | | Next Header | Hop Limit |
| Source Address | | | |
| Destination Address | | | |

【Figure 17】

| 0 | 1 | 2 | 3 |
|---|---|---|---|
| Source Port | | Destination Port | |
| Length | | Checksum | |

[Figure 18]

| Syntax | No. Bits | Format |
|---|---|---|
| Header_compression_index_IPv4 () { <br>    num_index <br>    for(i=0;i<num_index;i++) { <br>        index <br>        source_IP_address <br>        destination_IP_address <br>        source_port_number <br>        destination_port_number <br>    } <br>} | <br>8<br><br>8<br>32<br>32<br>16<br>16 | |

(a)

| Syntax | No. Bits | Format |
|---|---|---|
| Header_compression_index_IPv6 () { <br>    num_index <br>    for(i=0;i<num_index;i++) { <br>        index <br>        source_IP_address <br>        destination_IP_address <br>        source_port_number <br>        destination_port_number <br>    } <br>} | <br>8<br><br>8<br>128<br>128<br>16<br>16 | |

| Syntax | No. Bits | Format |
|---|---|---|
| Sub_stream_and_HC_mapping () { | | |
|     num_services | 8 | |
|     for(i=0;i<num_services;i++) { | | |
|         service_id | 16 | |
|         SID | 8 | |
|         HCF | 1 | |
|         reserved | 7 | |
|         if (HCF==1) { | | |
|             source_port_number | 16 | |
|         } | | |
|     } | | |
| } | | |

[Figure 20]

| Syntax | No. Bits | Format |
|---|---|---|
| Service_session_information () { | | |
|     num_services | 8 | |
|     for(i=0;i<num_services;i++) { | | |
|         service_id | 16 | |
|         service_session_info { | | |
|             source_IP_address | 32 | |
|             destination_IP_address | 32 | |
|             destination_port_number | 16 | |
|             PLP_ID | 8 | |
|         } | | |
|         SID | 8 | |
|         HCF | 1 | |
|         reserved | 7 | |
|         if (HCF==1) { | | |
|             source_port_number | 16 | |
|         } | | |
|     } | | |
| } | | |

[Figure 21]

| Syntax | No. Bits | Format |
|---|---|---|
| Service_session_information () { | | |
|   num_services | 8 | |
|   for(i=0;i<num_services;i++) { | | |
|       service_id | 16 | |
|       num_service_session | 8 | |
|       for(j=0;j<num_services_session;j++) { | | |
|           service_session_info { | | |
|               source_IP_address | 32 | |
|               destination_IP_address | 32 | |
|               destination_port_number | 16 | |
|               PLP_ID | 8 | |
|           } | | |
|       } | | |
|   } | | |
| } | | |

[Figure 22]

| Syntax | No. Bits | Format |
|---|---|---|
| Sub_stream_and_HC_mapping () {<br>  num_services<br>  for(i=0;i<num_services;i++) {<br>        service_id<br>        num_service_session<br>        for(j=0;j<num_services_session;j++) {<br>           SID<br>           service_session_info {<br>              source_IP_address<br>              destination_IP_address<br>              destination_port_number<br>              PLP_ID<br>           }<br>        HCF<br>        reserved<br>        if (HCF==1) {<br>           source_port_number<br>        }<br>    }<br>} | 8<br><br>16<br>8<br><br>8<br><br>32<br>32<br>16<br>8<br><br>1<br>7<br><br>16 | |

[Figure 23]

| Syntax | No. Bits | Format |
|---|---|---|
| Service_session_information() <br>     num_services <br>     for(i=0;i<num_services;i++) { <br>         service_id <br>         num_service_session <br>         for(j=0;j<num_services_session;j++) { <br>             service_session_info { <br>                 source_IP_address <br>                 destination_IP_address <br>                 destination_port_number <br>                 PLP_ID <br>             } <br>             SID <br>             HCF <br>             reserved <br>             if (HCF==1) { <br>                 source_port_number <br>             } <br>         } <br>     } <br> } | <br> 8 <br> <br> 16 <br> 8 <br> <br> <br> 32 <br> 32 <br> 16 <br> 8 <br> <br> 8 <br> 1 <br> 7 <br> <br> 16 | |

[Figure 24]
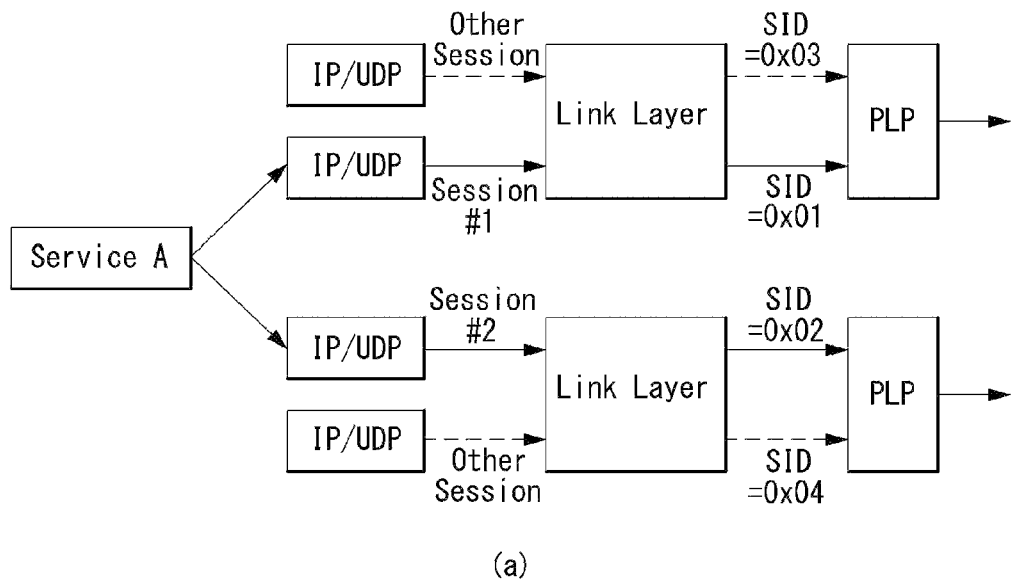
(a)
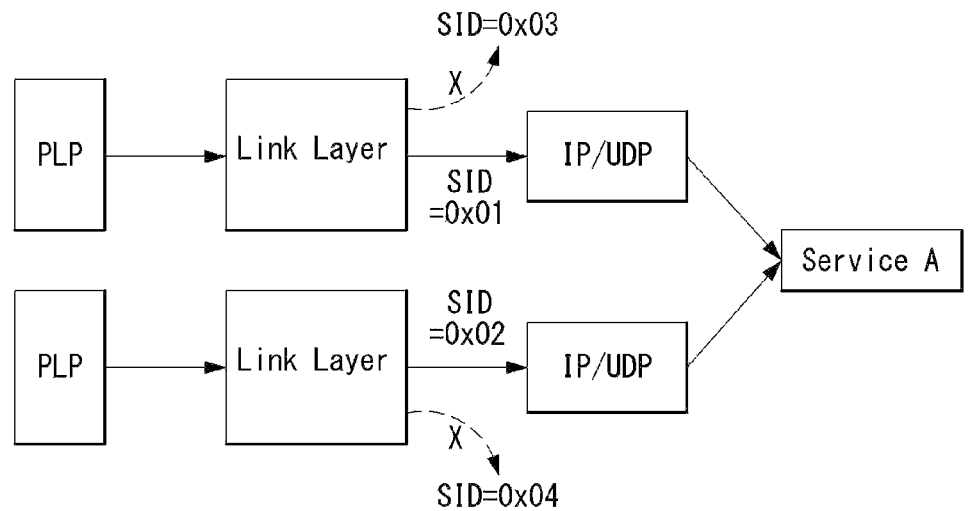
(b)

[Figure 25]

| Syntax | No. Bits | Format |
|---|---|---|
| Sub_stream_and_HC_mapping () { | | |
|     num_services | 8 | |
|     for(i=0;i<num_services;i++) { | | |
|         service_id | 16 | |
|         SID | 8 | |
|         num_service_session | 8 | |
|         for(j=0;j<num_services_session;j++) { | | |
|             HCF | 1 | |
|             reserved | 7 | |
|             if (HCF==1) { | | |
|                 HC_Index | 8 | |
|                 source_port_number | 16 | |
|             } | | |
|         } | | |
| } | | |

[Figure 26]

| Syntax | No. Bits | Format |
|---|---|---|
| Service_session_information () { | | |
|     num_services | 8 | |
|     for(i=0;i<num_services;i++) { | | |
|         service_id | 16 | |
|         SID | 8 | |
|         num_service_session | 8 | |
|         for(j=0;j<num_services_session;j++) { | | |
|             service_session_info { | | |
|                 source_IP_address | 32 | |
|                 destination_IP_address | 32 | |
|                 destination_port_number | 16 | |
|                 PLP_ID | 8 | |
|             } | | |
|             HC_Index | 8 | |
|             HCF | 1 | |
|             reserved | 7 | |
|             if (HCF==1) { | | |
|                 source_port_number | 16 | |
|             } | | |
|         } | | |
|     } | | |
| } | | |

[Figure 27]
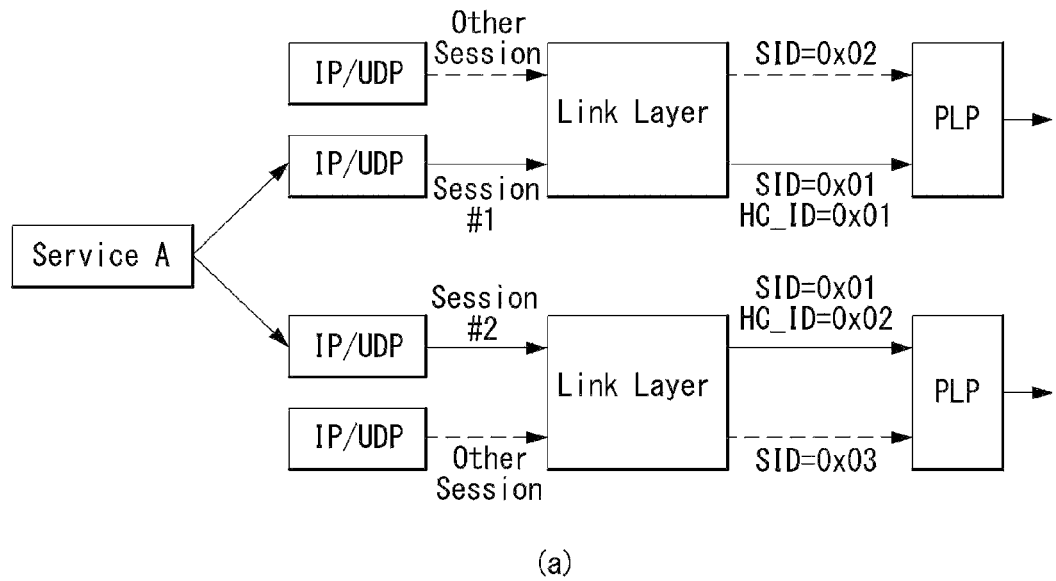
(a)
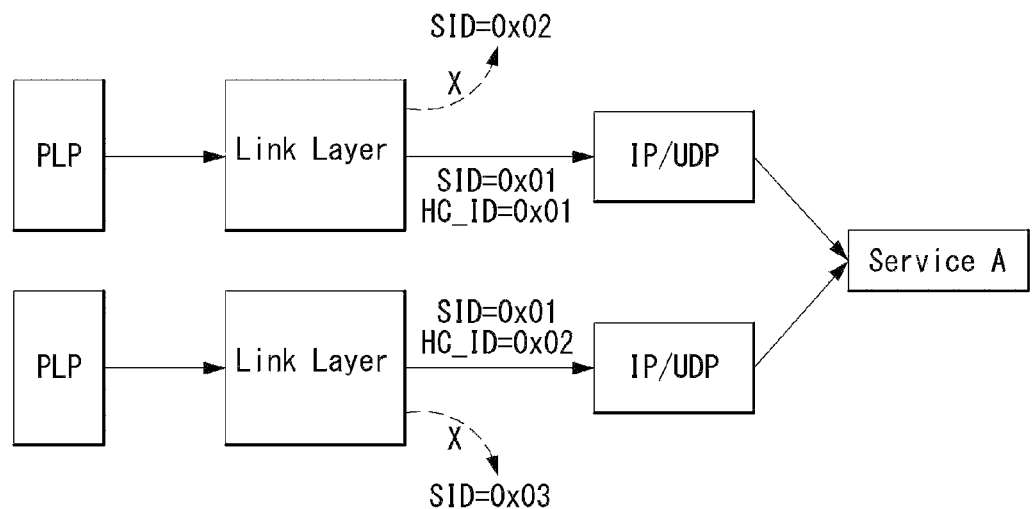
(b)

[Figure 28]

| Syntax | No. Bits | Format |
|---|---|---|
| Sub_stream_mapping () { | | |
|   num_PLP | 8 | |
|   for(i=0; i<num_PLP; i++) { | | |
|       PLP_ID | 16 | |
|     num_sub_stream | 8 | |
|     for((j=0; j<num_sub_stream; j++) { | | |
|         SID | 8 | |
|         Src_address | 32 | |
|         Dest_address | 32 | |
|         Src_port | 16 | |
|         Dest_port | 16 | |
|     } | | |
|   } | | |
| } | | |

【Figure 29】
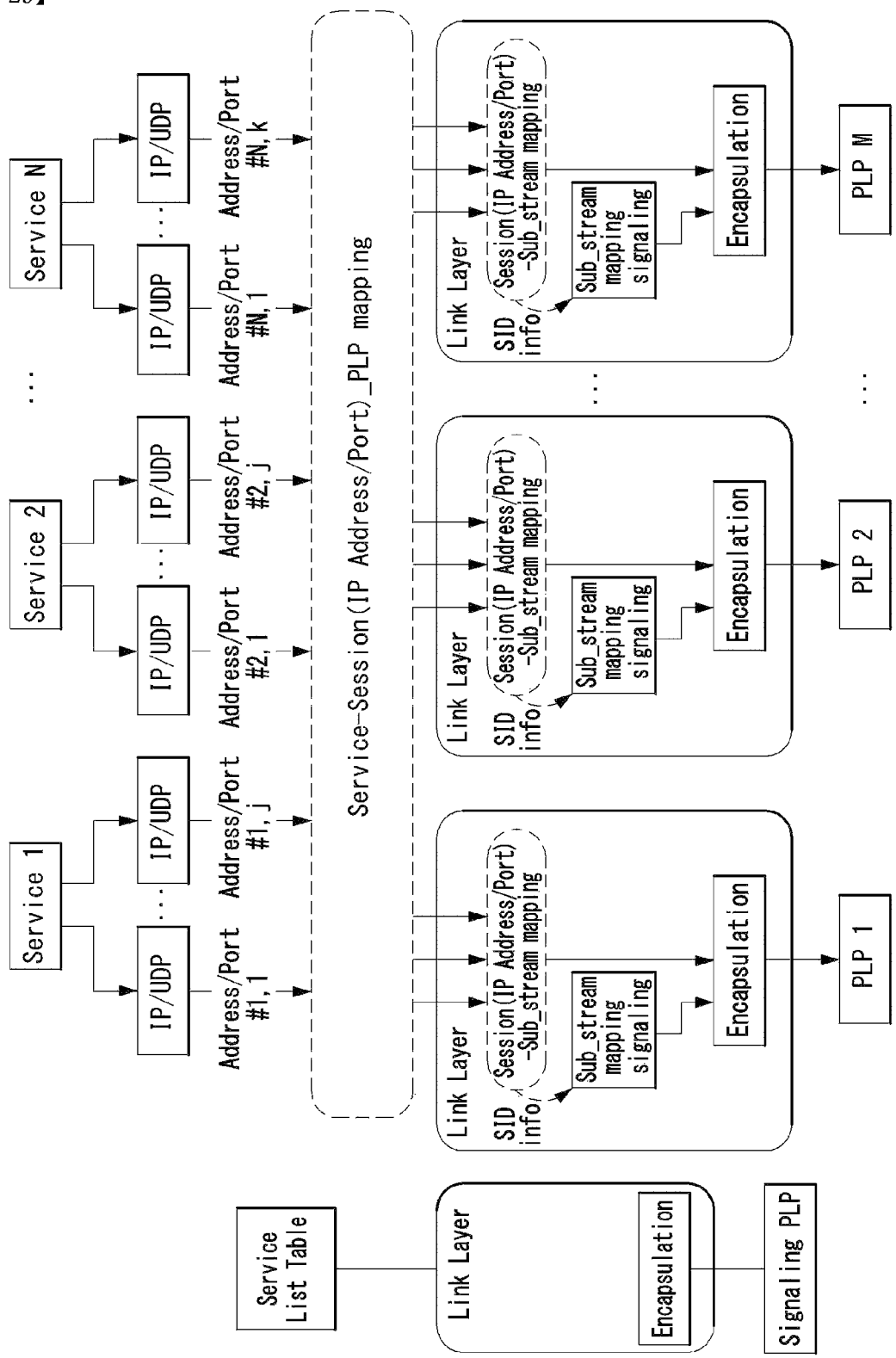

[Figure 30]
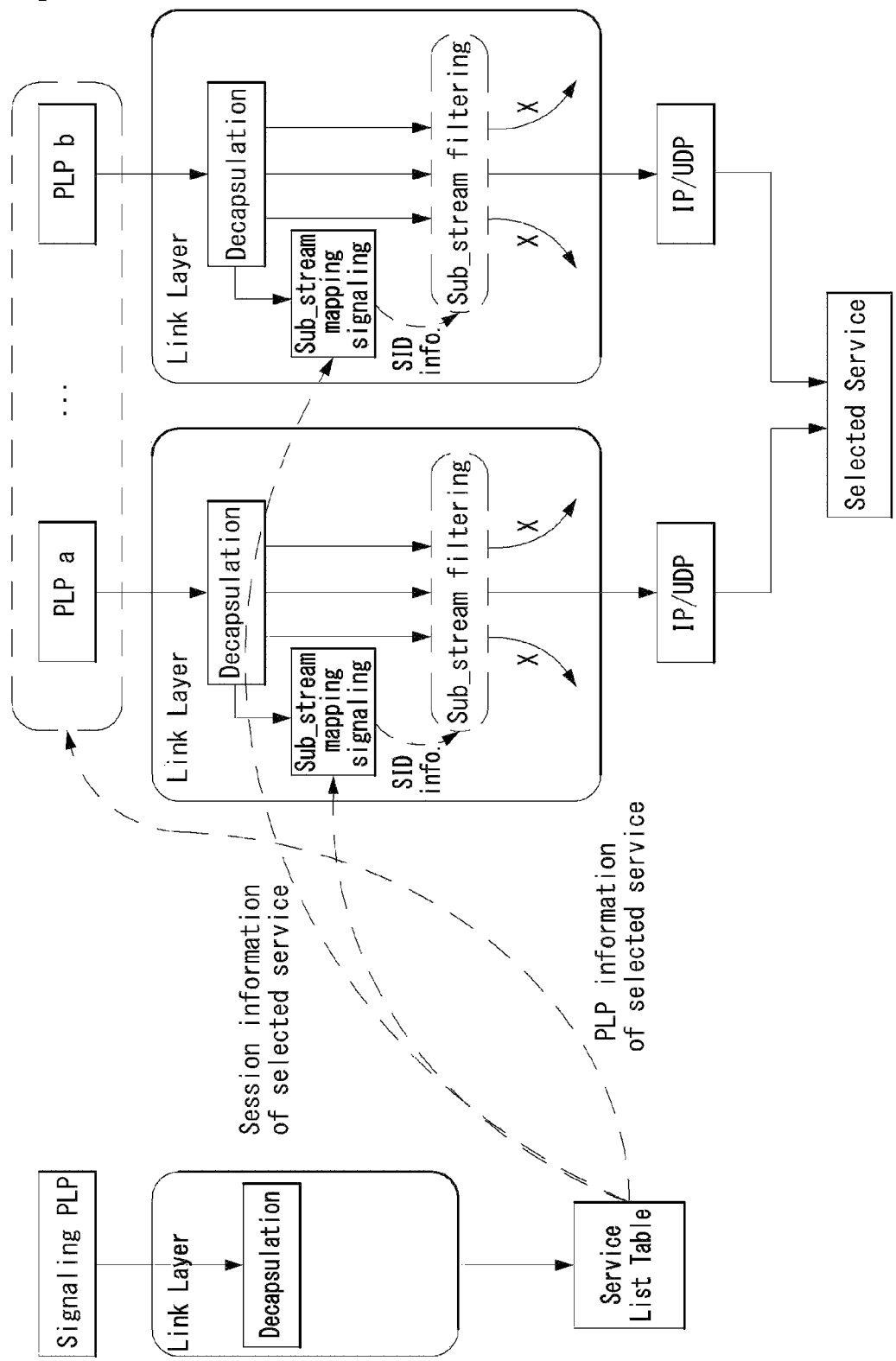

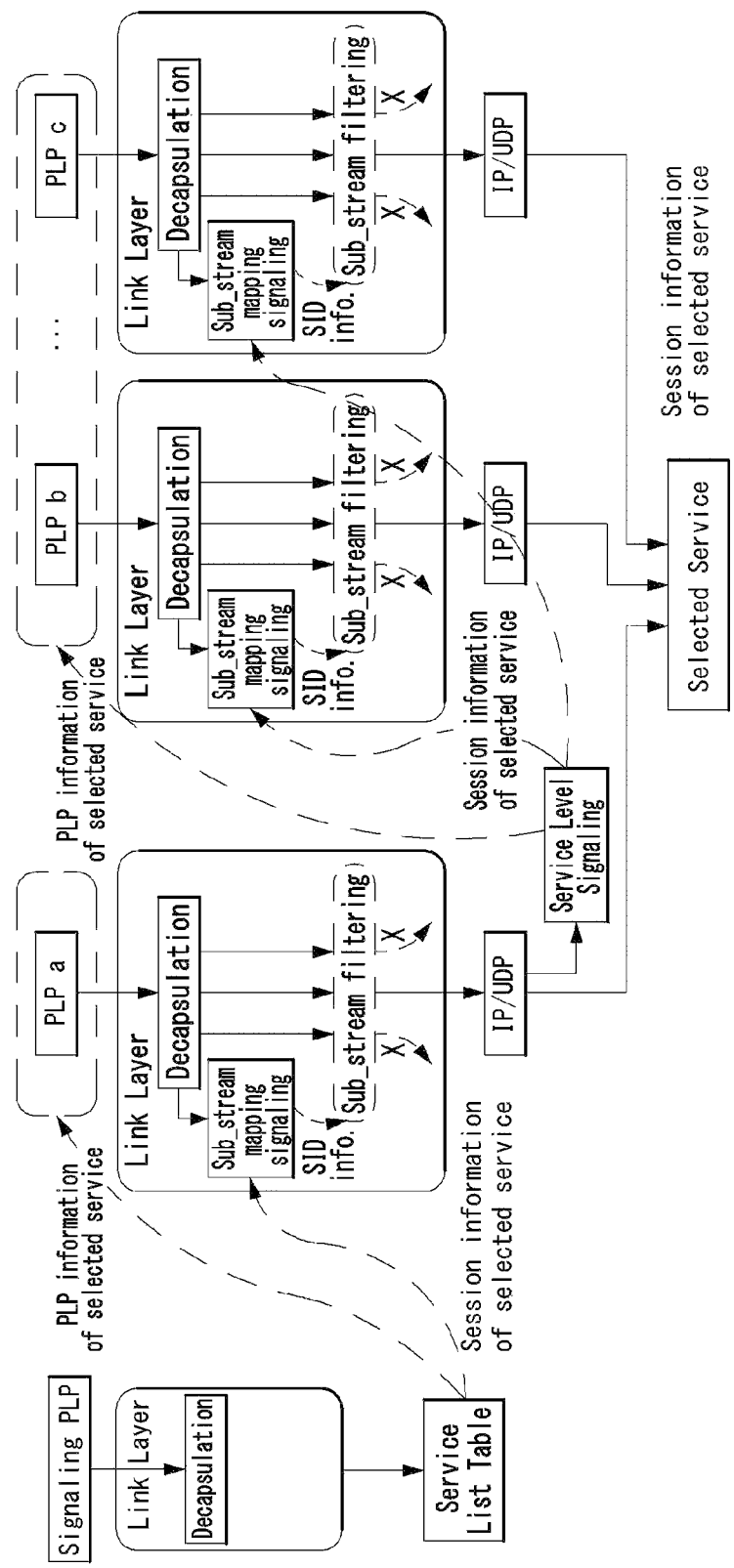
[Figure 31]

[Figure 32]

| Syntax | No. Bits | Format |
|---|---|---|
| Sub_stream_mapping () {      num_sub_stream      for(j=0;j< num_sub_stream;j++) {          SID          Src_address          Dest_address          Src_port          Dest_port          }      }  } | 8<br><br>8<br>32<br>32<br>16<br>16 | |

[Figure 33]
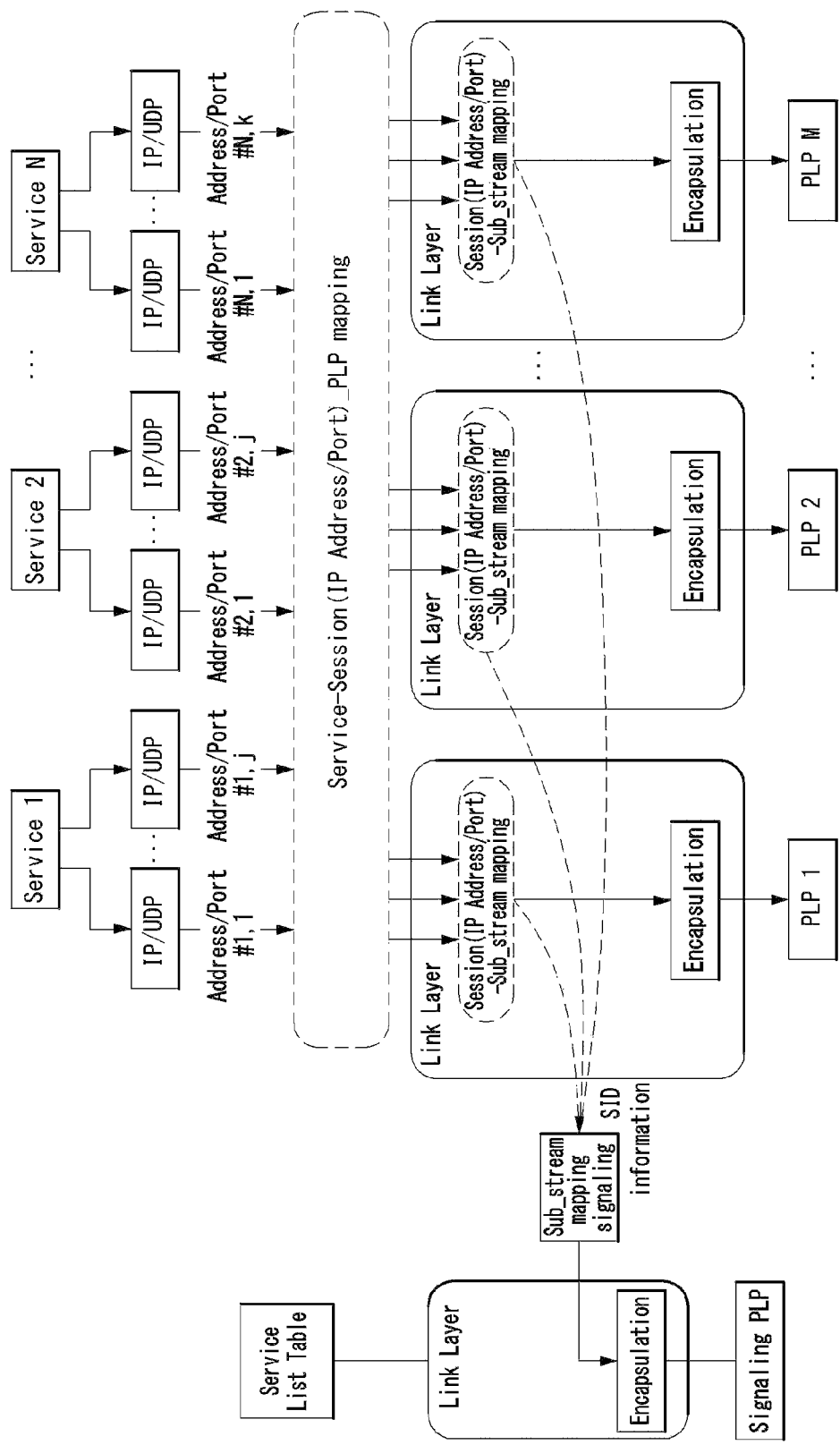

【Figure 34】
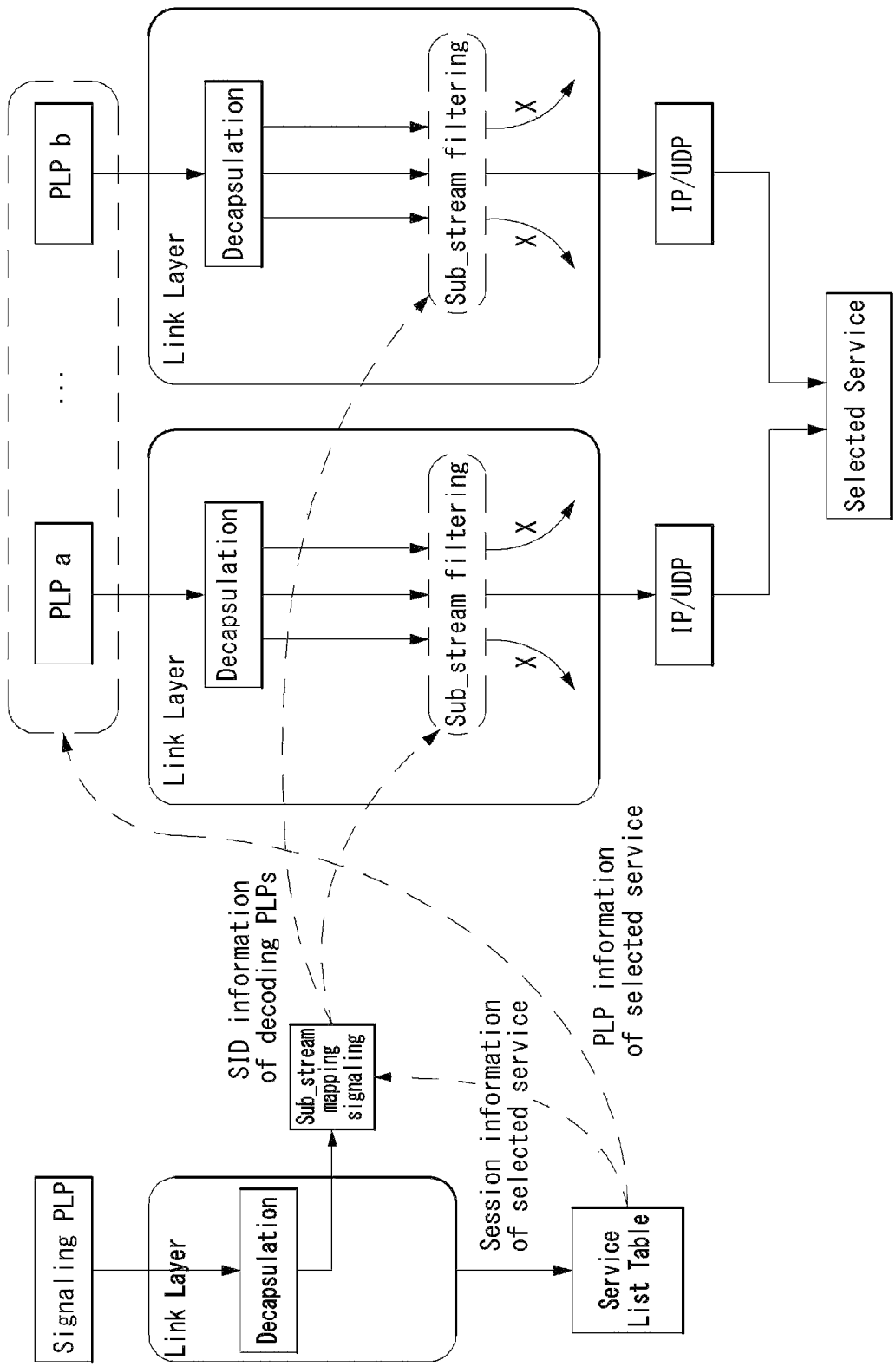

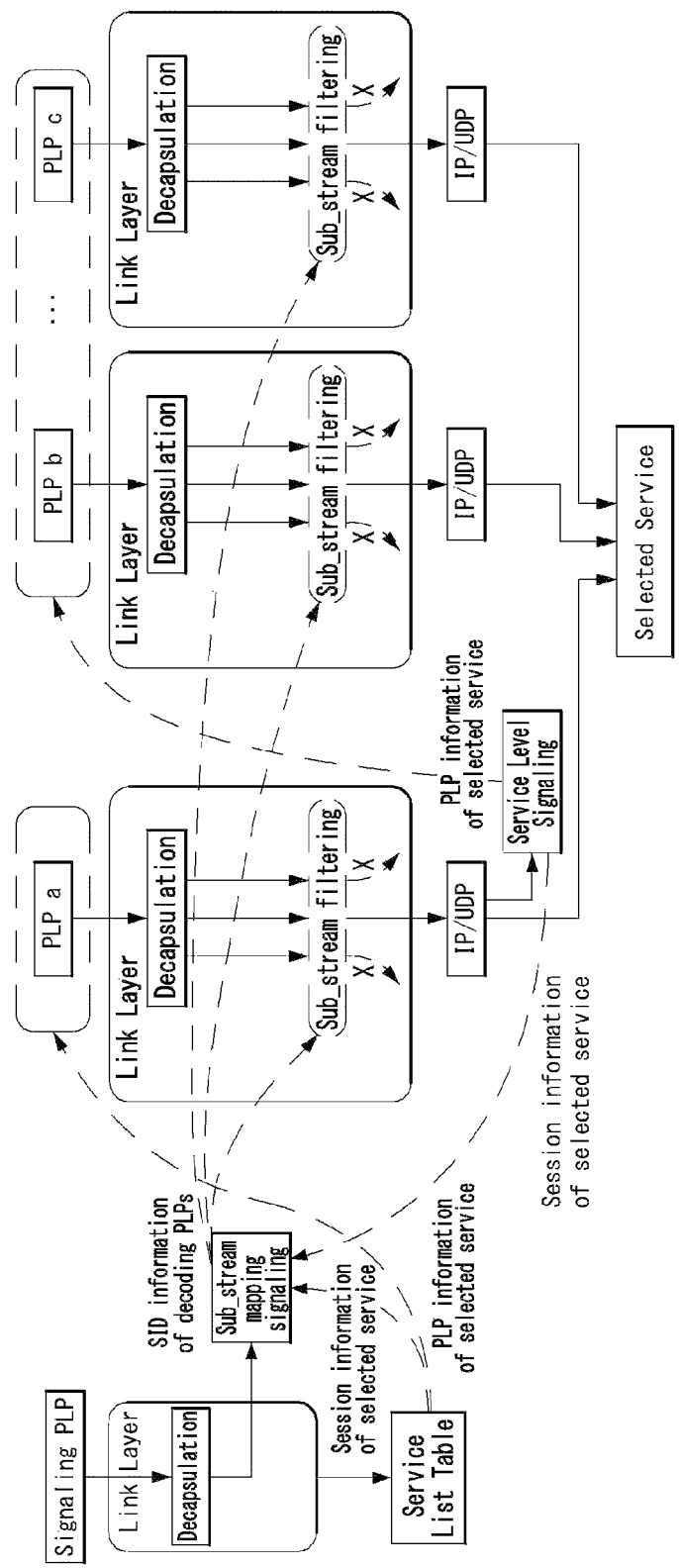
[Figure 35]

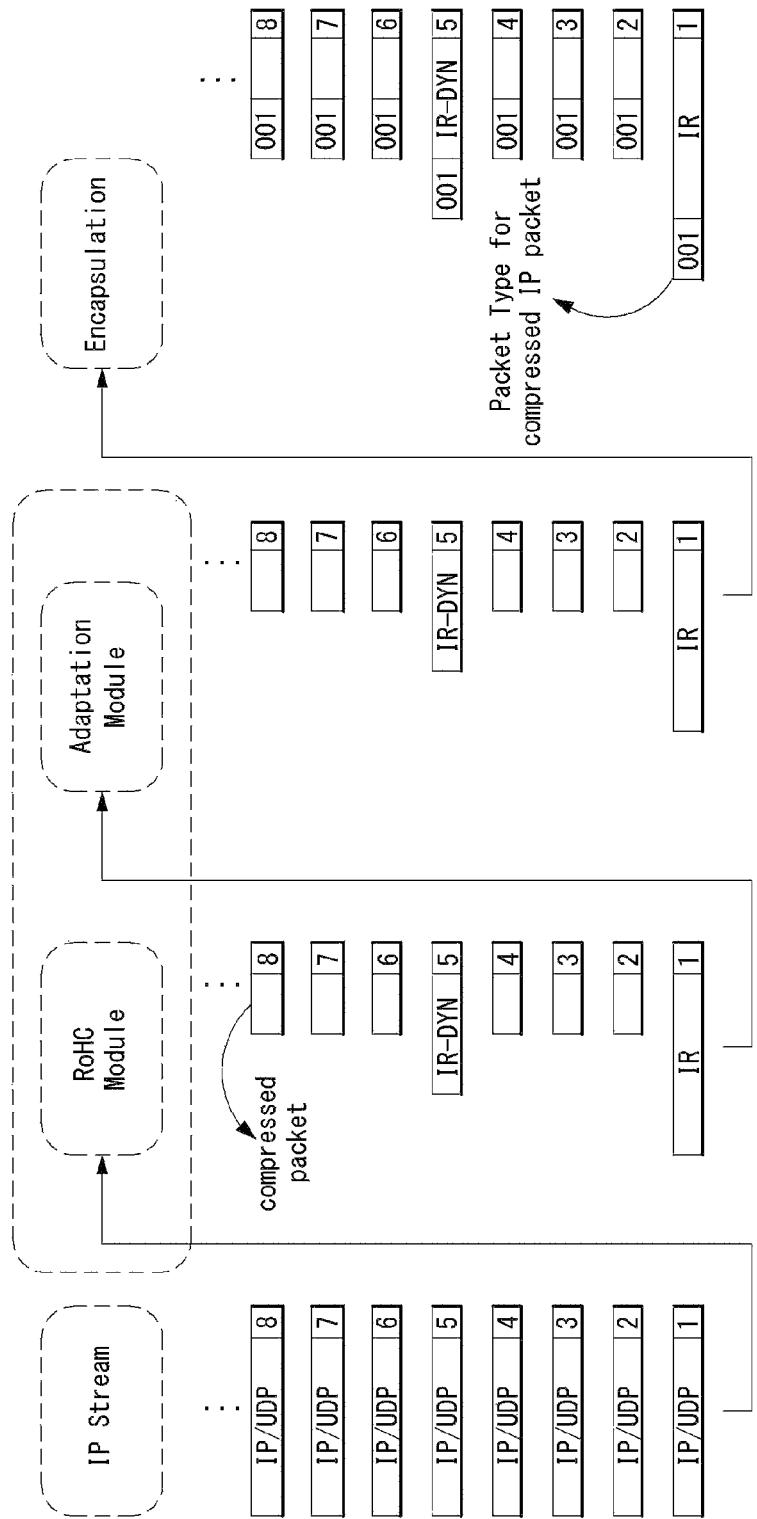
[Figure 36]

[Figure 37]
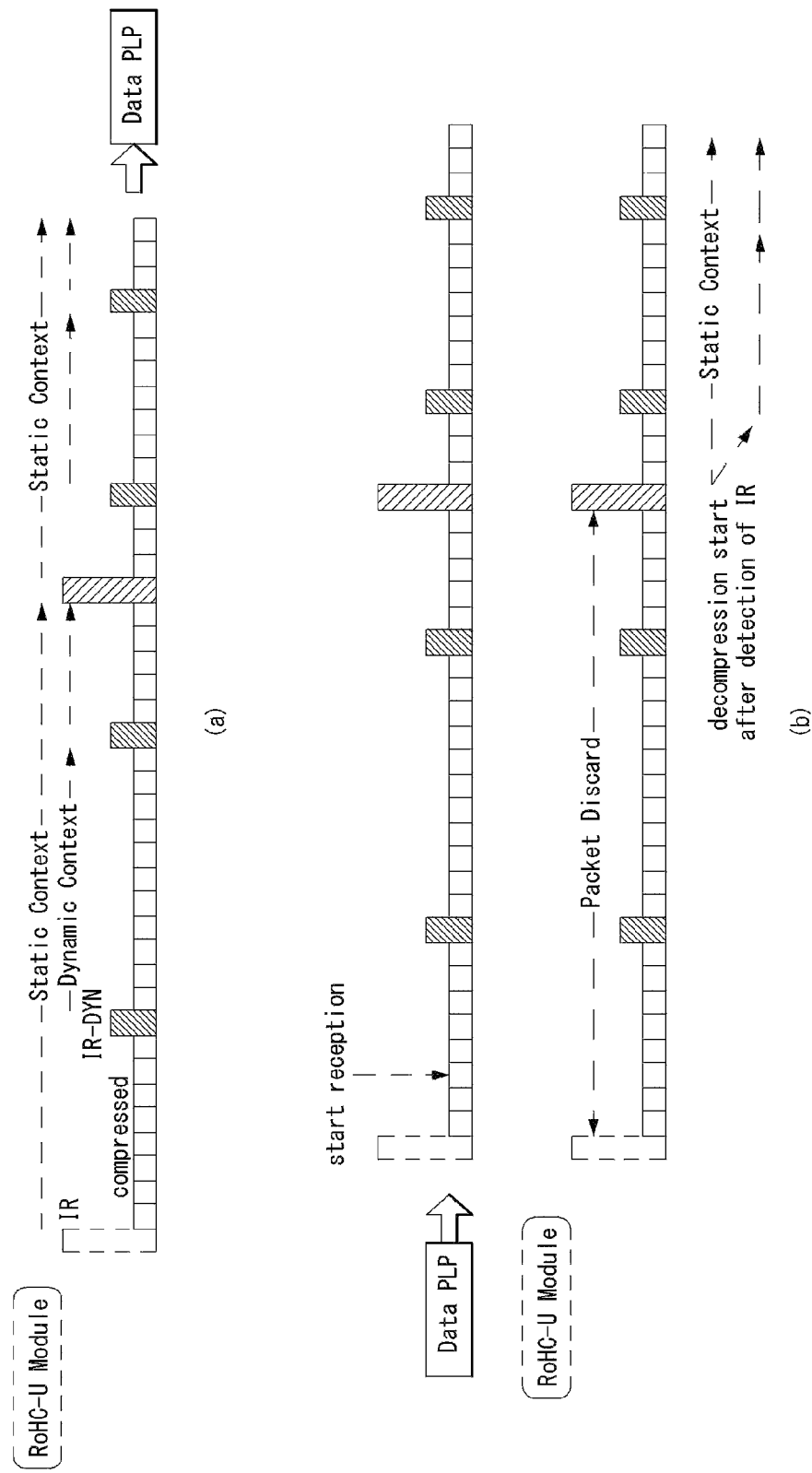

[Figure 38]
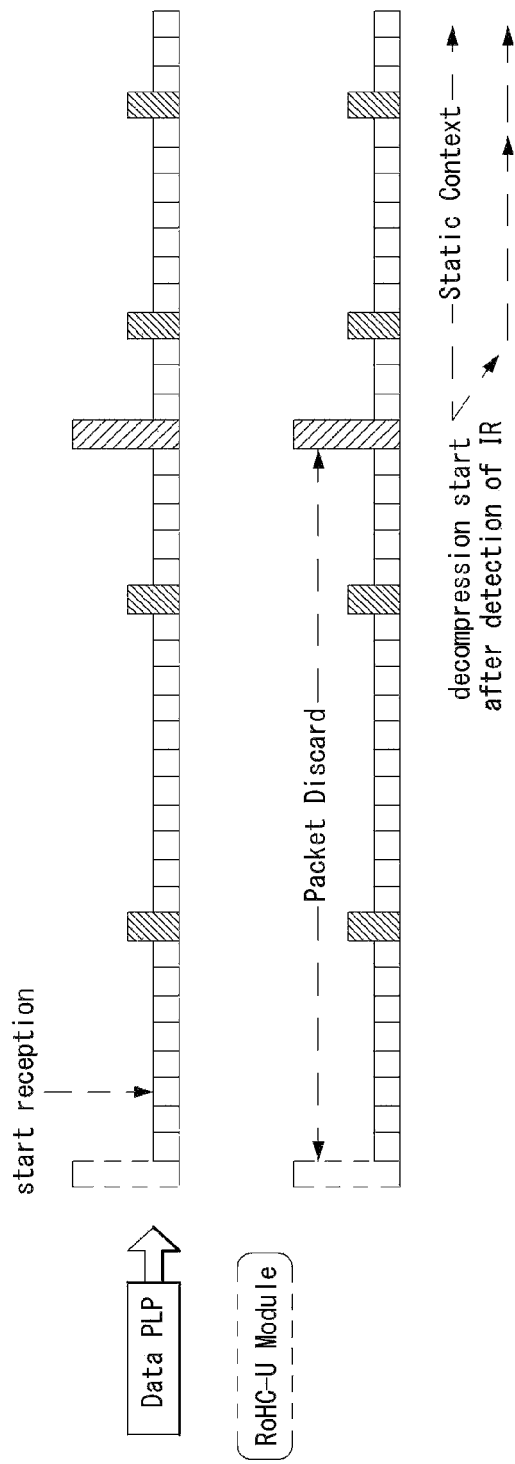

[Figure 39]
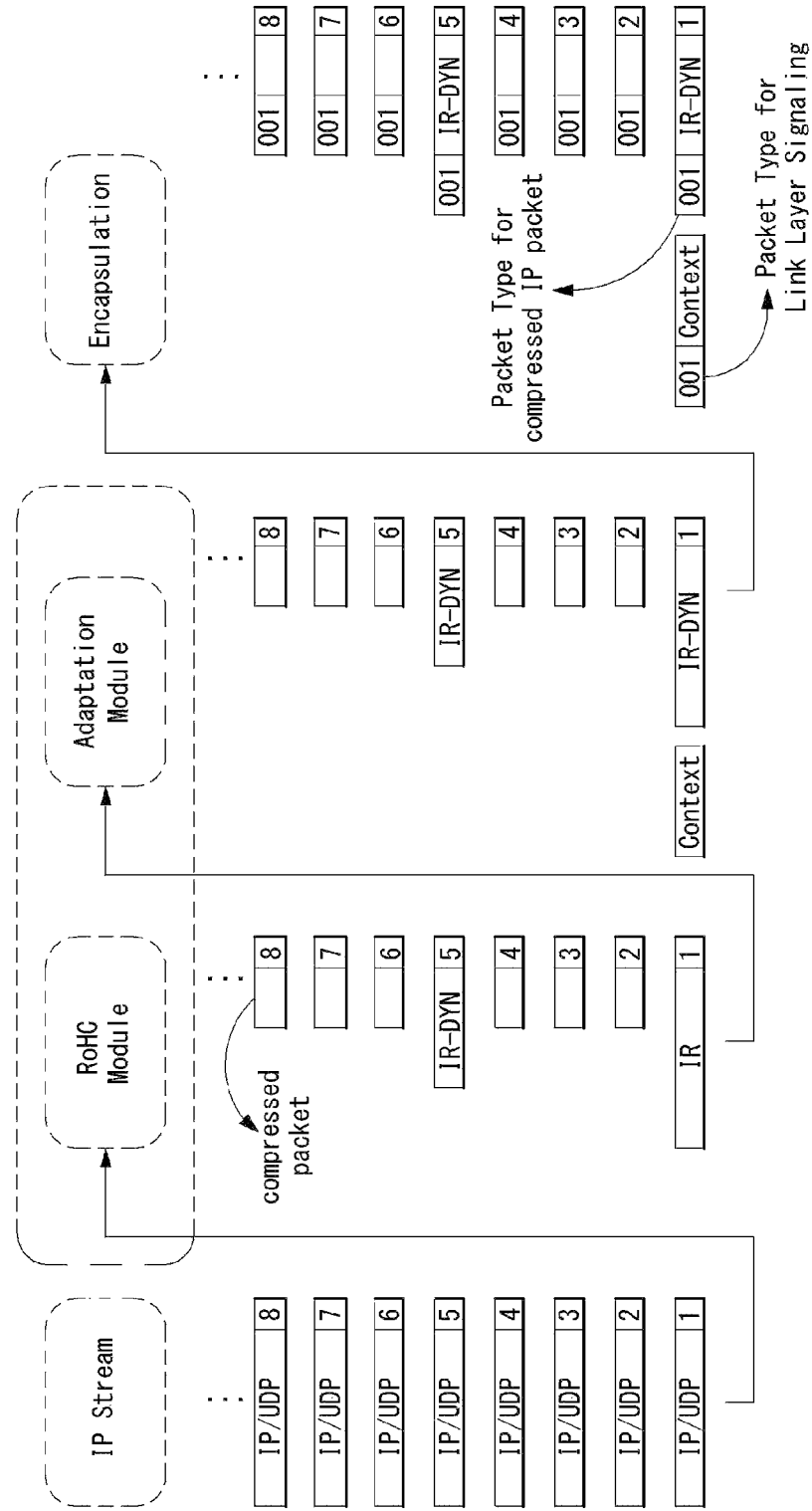

【Figure 40】
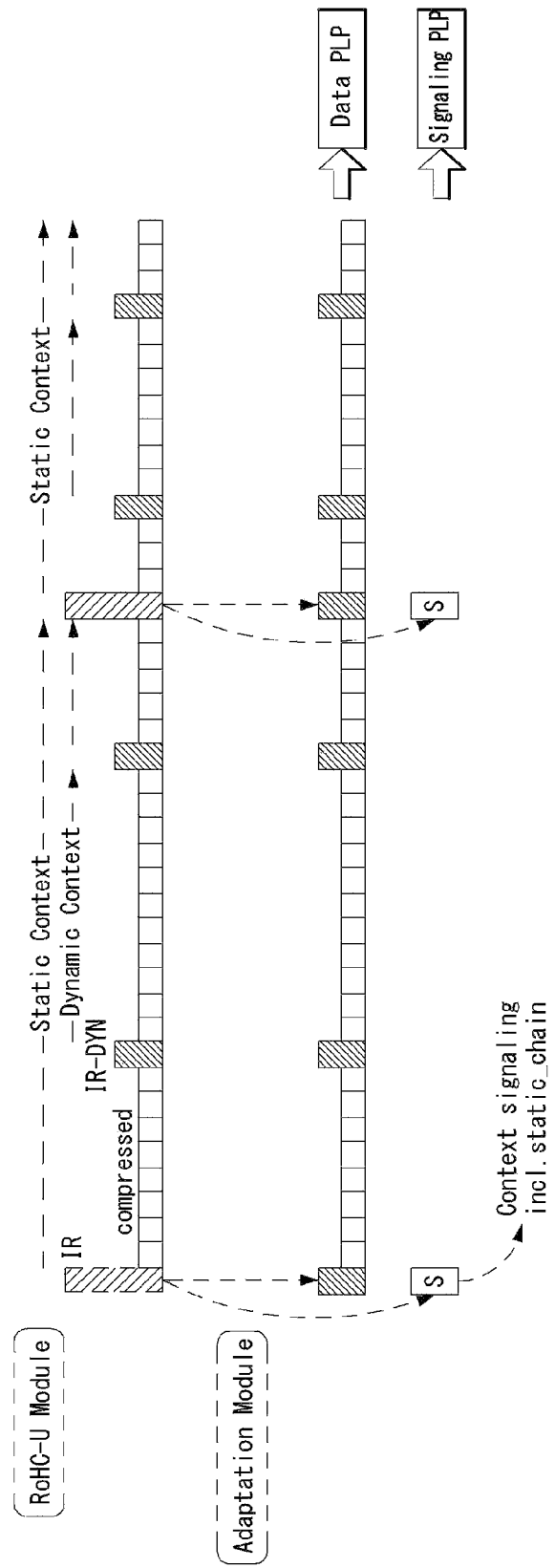

[Figure 41]
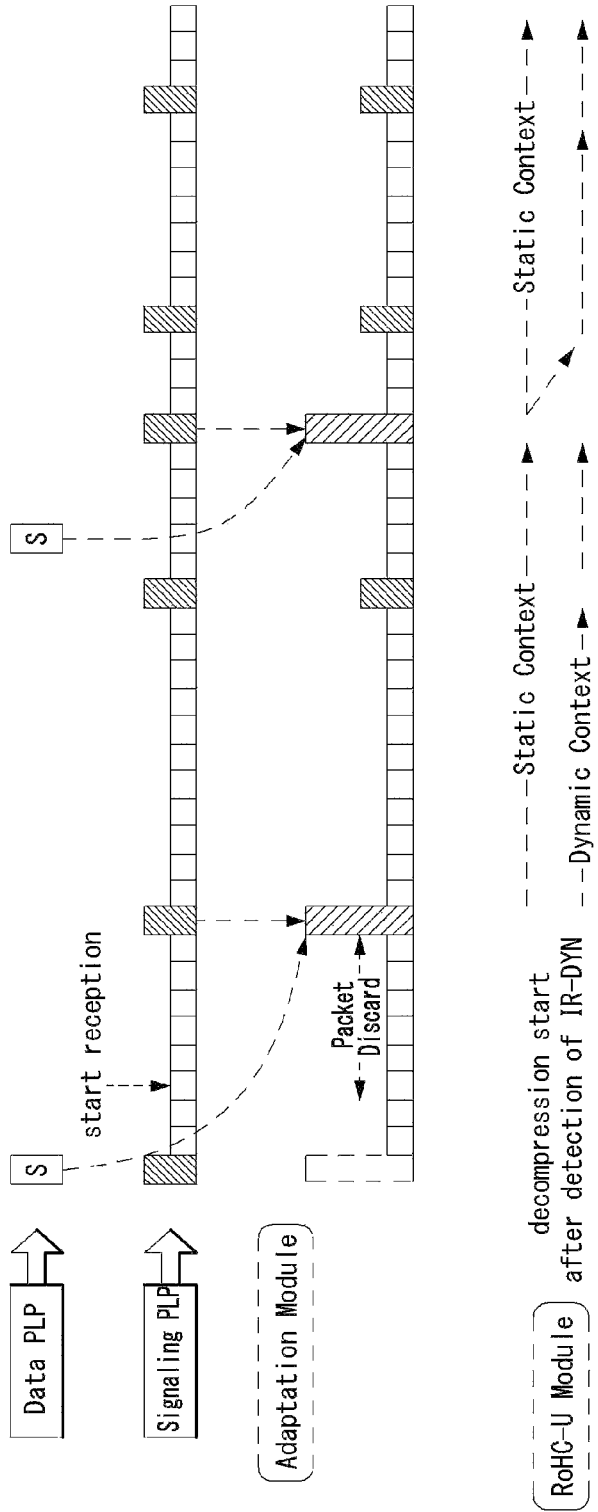

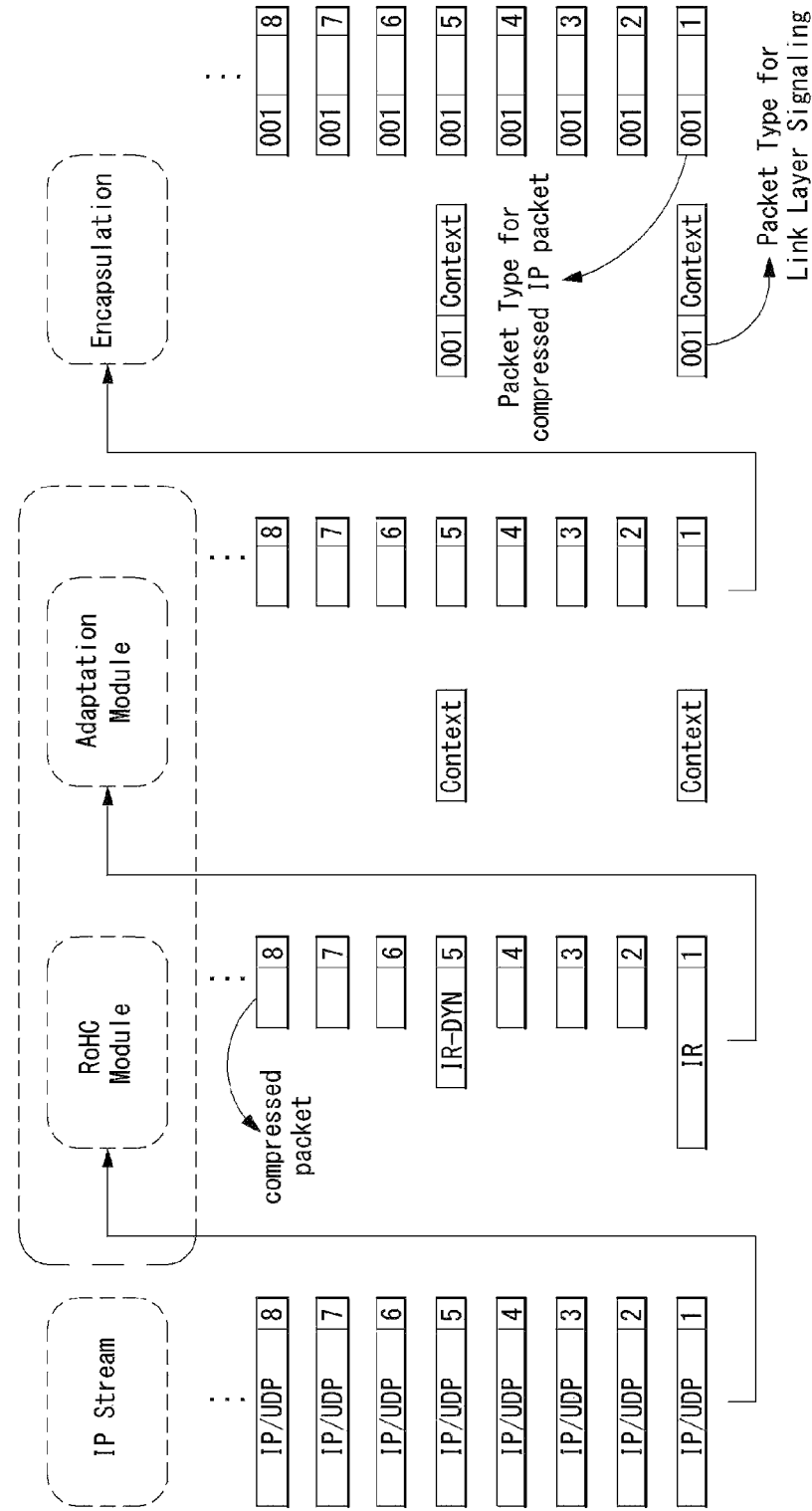
[Figure 42]

【Figure 43】
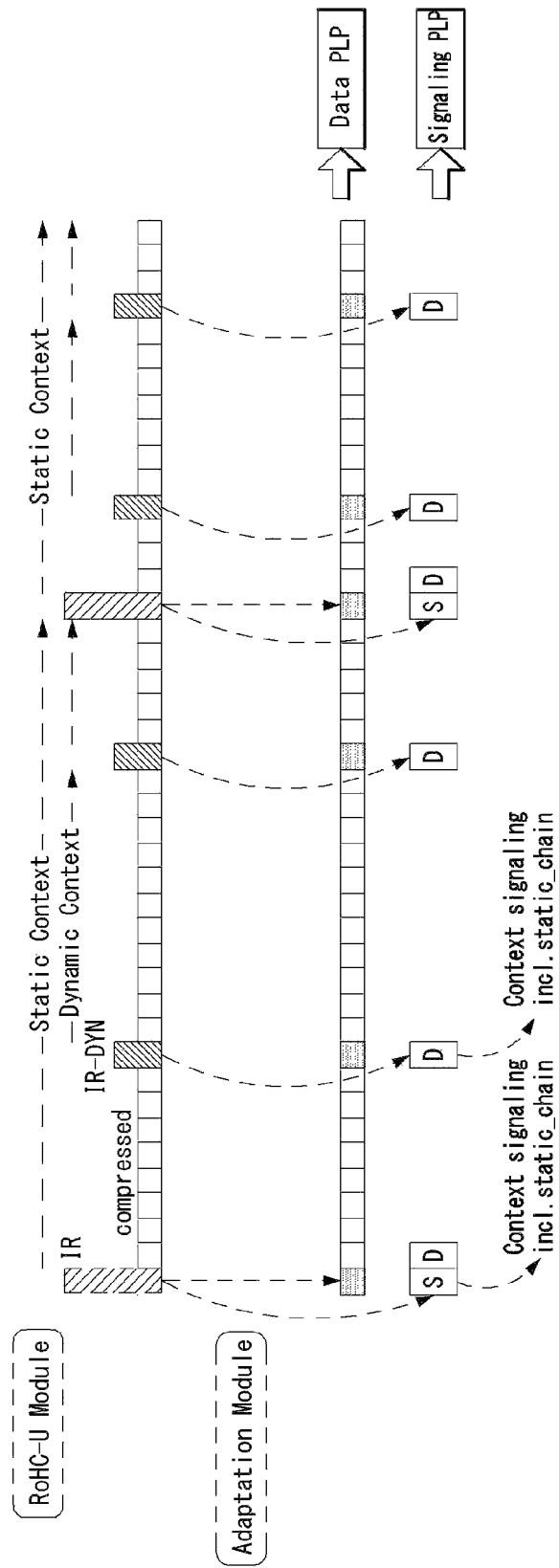

[Figure 44]
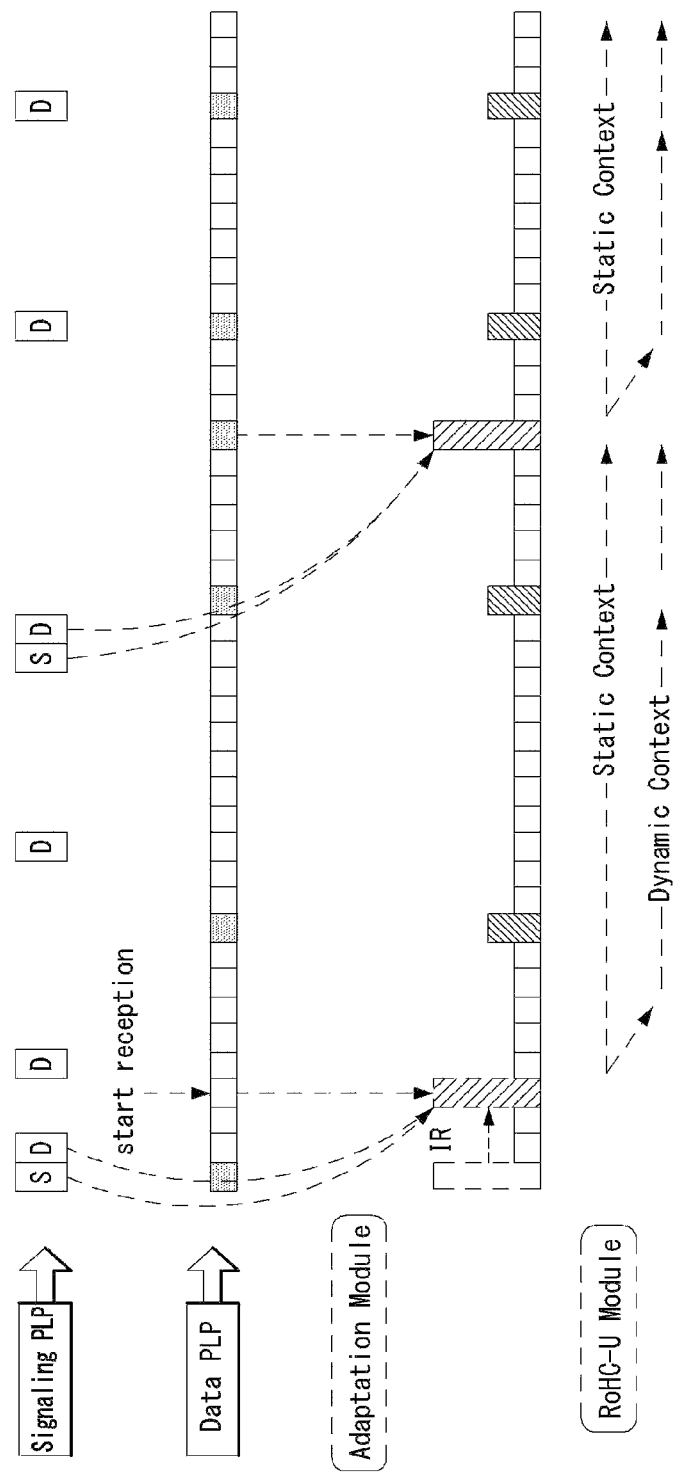

[Figure 45]
| Syntax | Number of bits (need to optimize) |
|---|---|
| ROHC-U_description_table | |
|     table_id | 8 |
|     PLP_ID | 8 |
|     context_id | 8 |
|     context_profile | 8 |
|     dynamic_chain_present | 1 |
|     sequence_number | 8 |
|     static_chain_length | 8 |
|     static_chain_byte() | var |
|     if (dynamic_chain_present) { | |
|         dynamic_chain_length | 8 |
|         dynamic_chain_byte() | var |
|     } | |
| } | |
[Figure 46]
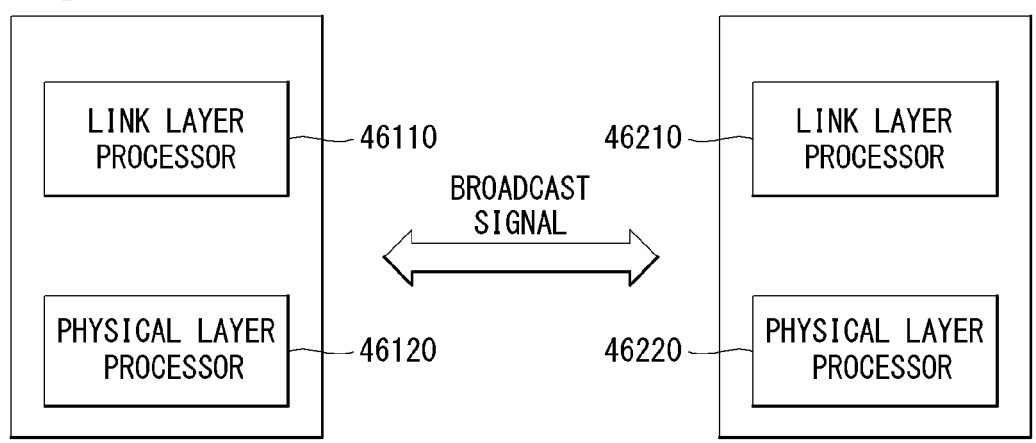

[Figure 47]
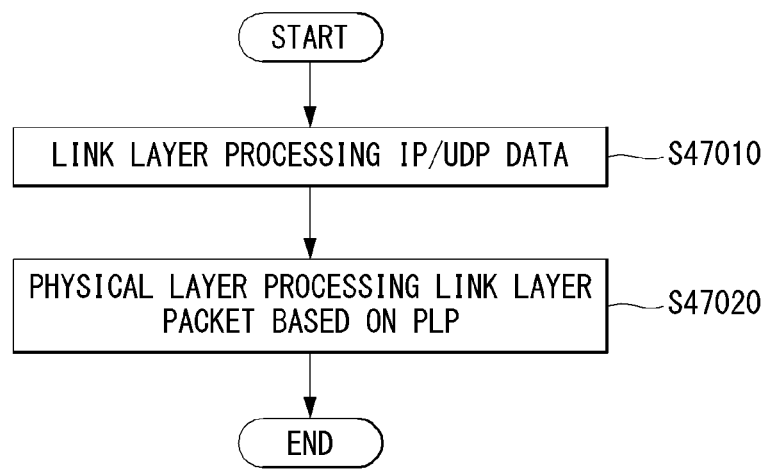

METHOD AND APPARATUS FOR TRANSMITTING/RECEIVING A BROADCAST SIGNAL

CROSS-REFERENCE TO RELATED APPLICATIONS

This application is the National Stage Application of International Application No. PCT/KR2016/007441, filed on Jul. 8, 2016, which claims the benefit of U.S. Provisional Application No. 62/189,754, filed on Jul. 8, 2015, U.S. Provisional Application No. 62/204,407, filed on Aug. 12, 2015 and U.S. Provisional Application No. 62/209,900, filed on Aug. 26, 2015, the contents of which are all hereby incorporated by reference herein in their entirety.

TECHNICAL FIELD

The present invention relates to an apparatus for transmitting a broadcast signal, an apparatus for receiving a broadcast signal, a method for transmitting a broadcast signal and a method for receiving a broadcast signal.

BACKGROUND ART

As analog broadcast signal transmission comes to an end, various technologies for transmitting/receiving digital broadcast signals have been developed. A digital broadcast signal may include a larger amount of video/audio data than an analog broadcast signal and may further include various types of additional data in addition to the video/audio data.

DISCLOSURE

Technical Problem

A digital broadcast system may provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

Technical Solution

The present invention proposes a method for transmitting a broadcast signal and an apparatus for transmitting a broadcast signal.

A method for transmitting a broadcast signal according to an embodiment of the present invention may include link layer processing IP/UDP data to output a link layer packet, and physical layer processing the link layer packet based on a PLP, where the link layer processing may include encapsulating the IP/UDP data and link layer signaling information into a separate link layer packet, where the link layer packet may include at least one of a base header, an additional header, an optional header or a payload, and the optional header includes Sub-stream ID (SID) information identifying a specific IP/UDP sub-stream included in the link layer packet, and where the specific IP/UDP sub-stream may indicate a specific data set identified in IP/UDP network layer, and the IP/UDP sub-stream may be identified by source IP address information, destination IP address information, source UDP port information and destination UDP port information.

In addition, in an embodiment of the present invention, the link layer signaling information may include mapping information for the PLP and IP/UDP data carried in the PLP, the mapping information may include PLP number information, IP/UDP sub-stream number information included in a PLP, source IP address information for each IP/UDP sub-stream, destination IP address information, source UDP port information and destination UDP port information, and SID information for the IP/UDP sub-stream, and the SID information may be used for filtering the IP/UDP sub-stream included in the PLP in a link layer level.

In addition, in an embodiment of the present invention, the additional header of the link layer packet may include flag information indicating whether the SID information is included in the optional header.

In addition, in an embodiment of the present invention, the link layer processing may further include compressing an IP header of the IP/UDP packet and generating at least one of an IR packet, an IR-DYN packet or a compressed packet and an adaptation step for selectively converting the compressed IP/UDP packet.

In addition, in an embodiment of the present invention, the operational mode of the adaptation step may include: a first adaptation mode in which the IR packet, the IR-DYN packet and the compressed packet are bypassed, a second adaptation mode in which context information of the IR packet is extracted and the IR packet is converted into the IR-DYN packet; and a third adaptation mode in which context information of the IR packet and the IR-DYN packet is extracted and the IR packet and the IR-DYN packet are converted into the compressed packet.

In addition, in an embodiment of the present invention, the link layer signaling information may include description information for the IP header compression, and the description information may include the extracted context information.

In addition, in an embodiment of the present invention, the link layer signaling packet may be included in a PLP forwarding a service list table, and the service list table may be signaling information describing a service.

A broadcast signal transmitter according to an embodiment of the present invention that performs the method for transmitting a broadcast signal may include a link layer processor configured to link layer process IP/UDP data to output a link layer packet; and a physical layer processor configured to physical layer process the link layer packet based on a PLP, where the link layer processor is configured to encapsulate the IP/UDP data and link layer signaling information into a separate link layer packet, where the link layer packet may include at least one of a base header, an additional header, an optional header or a payload, and the optional header includes Sub-stream ID (SID) information identifying a specific IP/UDP sub-stream included in the link layer packet, and where the specific IP/UDP sub-stream may indicate a specific data set identified in IP/UDP network layer, and the IP/UDP sub-stream may be identified by source IP address information, destination IP address information, source UDP port information and destination UDP port information.

Technical Effects

The present invention may process data according to service characteristics to control Quality of Services (QoS) for each service or service component, thereby providing various broadcast services.

The present invention may achieve transmission flexibility by transmitting various broadcast services through the same radio frequency (RF) signal bandwidth.

The present invention may provide a method and apparatus for transmitting/receiving a broadcast signal capable of receiving digital broadcast signals without an error even in the case of using a mobile reception device or in an indoor environment.

The present invention may support a next generation broadcast service efficiently in the environment that supports the hybrid broadcast that uses a terrestrial broadcast network and an Internet network.

Hereinafter, the additional effects of the present invention may be described together with the construction of the invention.

DESCRIPTION OF DRAWINGS

FIG. 1 is a diagram showing a protocol stack according to an embodiment of the present invention.

FIG. 2 is a diagram showing a service discovery procedure according to one embodiment of the present invention.

FIG. 3 is a diagram showing a low level signaling (LLS) table and a service list table (SLT) according to one embodiment of the present invention.

FIG. 4 is a diagram showing a USBD and an S-TSID delivered through ROUTE according to one embodiment of the present invention.

FIG. 5 is a diagram showing a USBD delivered through MMT according to one embodiment of the present invention.

FIG. 6 is a diagram showing link layer operation according to one embodiment of the present invention.

FIG. 7 is a diagram showing a link mapping table (LMT) according to one embodiment of the present invention.

FIG. 8 illustrates a configuration of a broadcast signal transmission apparatus for future broadcast services according to an embodiment of the present invention.

FIG. 9 illustrates a write operation of a time interleaver according to an embodiment of the present invention.

FIG. 10 illustrates an interlaving address generator including a main pseudo-random binary sequence (PRBS) generator and a sub-PRBS generator according to each FFT mode which are included in a frequency interleavaer according to an embodiment of the present invention.

FIG. 11 illustrates a link layer packet according to an embodiment of the present invention.

FIG. 12 illustrates a structure of a link layer packet in more detail according to an embodiment of the present invention.

FIG. 13 illustrates a procedure for transmitting and receiving broadcast data using an SID according to an embodiment of the present invention.

FIG. 14 illustrates link layer signaling information according to an embodiment of the present invention.

FIG. 15 illustrates an IPv4 packet header structure according to an embodiment of the present invention.

FIG. 16 illustrates an IPv6 packet header structure according to an embodiment of the present invention.

FIG. 17 illustrates a UDP packet header structure according to an embodiment of the present invention.

FIG. 18 illustrates mapping information for an index and IP address/port number as link layer signaling information according to an embodiment of the present invention.

FIG. 19 illustrates mapping information according to an embodiment of the present invention.

FIG. 20 illustrates mapping information according to an embodiment of the present invention.

FIG. 21 illustrates service session information according to an embodiment of the present invention.

FIG. 22 illustrates mapping information according to an embodiment of the present invention.

FIG. 23 illustrates mapping information according to an embodiment of the present invention.

FIG. 24 illustrates a link layer processing of transmitter/receiver according to an embodiment of the present invention.

FIG. 25 illustrates mapping information according to an embodiment of the present invention.

FIG. 26 illustrates service session information according to an embodiment of the present invention.

FIG. 27 illustrates a link layer processing of transmitter/receiver according to an embodiment of the present invention.

FIG. 28 illustrates link layer mapping information according to an embodiment of the present invention.

FIG. 29 illustrates an operational structure of a transmitter according to an embodiment of the present invention.

FIG. 30 illustrates an operational structure of a receiver according to an embodiment of the present invention.

FIG. 31 illustrates an operational structure of a receiver according to another embodiment of the present invention.

FIG. 32 illustrates mapping information according to an embodiment of the present invention.

FIG. 33 illustrates an operational structure of a transmitter according to an embodiment of the present invention.

FIG. 34 illustrates an operational structure of a receiver according to an embodiment of the present invention.

FIG. 35 illustrates an operational structure of a receiver according to another embodiment of the present invention.

FIG. 36 illustrates an IP header compression of a first adaptation mode according to an embodiment of the present invention.

FIG. 37 illustrates a transmission operation of a first adaptation mode according to an embodiment of the present invention.

FIG. 38 illustrates a reception operation of a first adaptation mode according to an embodiment of the present invention.

FIG. 39 illustrates an IP header compression of a second adaptation mode according to an embodiment of the present invention.

FIG. 40 illustrates a transmission operation of a second adaptation mode according to an embodiment of the present invention.

FIG. 41 illustrates a reception operation of a second adaptation mode according to an embodiment of the present invention.

FIG. 42 illustrates an IP header compression of a third adaptation mode according to an embodiment of the present invention.

FIG. 43 illustrates a transmission operation of a third adaptation mode according to an embodiment of the present invention.

FIG. 44 illustrates a reception operation of a second adaptation mode according to an embodiment of the present invention.

FIG. 45 illustrates RoHC-U Description Table (RDT) information according to an embodiment of the present invention.

FIG. 46 illustrates a broadcast signal transmitter and a broadcast signal receiver according to an embodiment of the present invention.

FIG. 47 illustrates a broadcast signal transmission method according to an embodiment of the present invention.

BEST MODE FOR INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings. Also, the term block and module are used similarly to indicate logical/functional unit of particular signal/data processing.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO or MIMO according to one embodiment. A non-MIMO scheme according to an embodiment of the present invention may include a multiple input single output (MISO) scheme, a single input single output (SISO) scheme, etc. The present invention proposes a physical profile (or system) optimized to minimize receiver complexity while attaining the performance required for a particular use case.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltlnetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltlnetUrl element may provide base URL information used to obtain service signaling information and ESG for the services of the SLT over broadband. The sltlnetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svclnetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may employ a header compressor/decompressor and/or an adaptation module. The IP header compressor (RoHC compressor) may reduce the size of each IP packet header based on the RoHC scheme. Thereafter, the adaptation module may extract context information and generate signaling information from each packet stream. A receiver may parse signaling information associated with the packet stream and attach context information to the packet stream. The RoHC decompressor may restore the packet header to reconfigure an original IP packet. Hereinafter, IP header compression may mean only IP header compression by a header compression or a combination of IP header compression and an adaptation process by an adaptation module. The same is true in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may provide construction of link layer signaling using context information and/or configuration parameters. The adaptation function may use previous configuration parameters and/or context information to periodically transmit link layer signaling through each physical frame.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT shall be transmitted whenever the context information is changed. In addition, in some embodiments, the RDT shall be transmitted every physical frame. In order to transmit the RDT every physical frame, the previous RDT may be reused.

The receiver may select a first PLP and first acquire signaling information of the SLT, the RDT, the LMT, etc., prior to acquisition of a packet stream. When signaling information is acquired, the receiver may combine the signaling information to acquire mapping between service—IP information—context information—PLP. That is, the receiver may check which service is transmitted in which IP streams or which IP streams are delivered in which PLP and acquire context information of the PLPs. The receiver may select and decode a PLP carrying a specific packet stream. The adaptation module may parse context information and combine the context information with the compressed packets. To this end, the packet stream may be restored and delivered to the RoHC decompressor. Thereafter, decompression may start. At this time, the receiver may detect IR packets to start decompression from an initially received IR packet (mode 1), detect IR-DYN packets to start decompression from an initially received IR-DYN packet (mode 2) or start decompression from any compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be predefined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may also be referred to as multicast. Information on IP streams or transport sessions transmitted through a specific PLP may be acquired through the LMT. In contrast, information on through which PLP a specific transport session is delivered may be acquired.

The LMT may be delivered in any PLP identified as carrying LLS. Here, the PLP in which the LLS is delivered may be identified by an LLS flag of L1 detail signaling information of a physical layer. The LLS flag may be a flag field indicating whether the LLS is delivered in the PLP, each PLP. Here, L1 detail signaling information may correspond to the below-described PLS2 data.

That is, the LMT may be delivered in the same PLP along with the LLS. Each LMT shall describe mapping between PLPs and IP addresses/ports as described above. As described above, the LLS may include an SLT and the IP address/port described in the LMT may be any IP address/port associated with any service described in the SLT delivered in the same PLP as the LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, the LMT may describe, in a PLP loop, PLPs for any IP address/port associated with any service described in the SLT delivered together, as described above.

The signaling_type field may indicate the type of signaling information delivered by the table. The value of signaling_type field for the LMT may be set to 0x01. The signaling_type field may be omitted. The PLP_ID field may identify a target PLP to be described. If the PLP loop is used, each PLP_ID field may identify each target PLP. The PLP_ID field and subsequent fields thereof may be included in the PLP loop. The below-described PLP_ID field is an identifier for one PLP of the PLP loop and the below-described fields may be fields for the corresponding PLP.

The num_session field may indicate the number of higher layer sessions delivered through the PLP identified by the corresponding PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field and/or a context_id field.

The src_IP_add field, the dst_IP_add field, the src_UDP_port field and the dst_UDP_port field may indicate the source IP address, the destination IP address, the source UDP port and the destination UDP port of the transport session among the higher layer sessions delivered through the PLP identified by the corresponding PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. If header compression is applied (compressed_flag=1), the RDT may be present and the PLP ID field of the RDT may have the same value as the PLP_ID field associated with this compressed_flag field.

The SID field may indicate the SIDs (sub stream IDs) of the link layer packets delivering the transport session. These link layer packets may include SIDs having the same values as this SID field in the optional header thereof. To this end, the receiver may filter link layer packets using LMT information and the SID information of the link layer packet header, without parsing all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

FIG. 8 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame buidling block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams.

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

Since QoS depends on characteristics of a service provided by the broadcast signal transmission apparatus for future broadcast services according to the embodiment of the present invention, data corresponding to respective services needs to be processed using different schemes.

BICM block 1010 may include a processing block for a profile (or system) to which MIMO is not applied, and a processing block for a profile (or system) to which MIMO is applied and may comprise a plurality blocks for processing each Data Pipe.

A processing block of the BICM block to which MIMO is not applied may include a data FEC encoder, a bit interleaver, a constellation mapper, a signal space diversity (SSD) encoding block and a time interleaver. A processing block of the BICM block to which MIMO is applied may is distinguished from the processing block of the BICM block to which MIMO is not applied in that the processing block further includes a cell-word demultiplexer and a MIMO encoding block The data FEC encoder performs FEC encoding on an input BBF to generate FECBLOCK procedure using outer coding (BCH) and inner coding (LDPC). The outer coding (BCH) is optional coding method. The bit interleaver may interleave outputs of the data FEC encoder to achieve optimized performance with a combination of LDPC codes and a modulation scheme while providing an efficiently implementable structure. A detailed operation of the bit interleaver will be described later. The constellation mapper may modulate each cell word from the bit interleaver or the cell-word demultiplexer in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point. This constellation mapping is applied only for DPs. It is observed that QAM-16 and NUQs are square shaped, while NUCs have arbitrary shapes. Both NUQs and NUCs are defined specifically for each code rate and the particular one used is signaled by the parameter DP_MOD field in the PLS2 data. The time interleaver may operates at a DP level. Parameters of time interleaving (TI) may be set differently for each DP. The time interlaever according to an embodiment of the present invention can be positioned between a BICM chain block and a frame builder.

Here, the time interleaver according to an embodiment of the present invention can use both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer. A PLP mode according to an embodiment of the present invention may include a single PLP mode or a multi-PLP mode according to the number of PLPs processed by a broadcast signal transmitter or a broadcast signal transmission apparatus. In the present invention, time interleaving in which different time interleaving schemes are applied according to PLP modes may be referred to as hybrid time interleaving.

The hybrid time interleaver may include a BI and a CI. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be different from a case of PLP_NUM=1. The hybrid time deinterleaver may perform an operation corresponding to an inverse operation of the hybrid time interleaver described above.

The cell-word demultiplexer is used for dividing a single cell-word stream into dual cell-word streams for MIMO processing. The MIMO encoding block may process an output of the cell-word demultiplexer using a MIMO encoding scheme. The MIMO encoding scheme of the present invention may be defined as full-rate spatial multiplexing (FR-SM) to provide capacity increase with relatively small complexity increase at the receiver side. MIMO processing is applied at the DP level. NUQ (e1,i and e2,i) corresponding to a pair of constellation mapper outputs is fed to an input of a MIMO encoder and paired MIMO encoder output (g1,i and g2,i) is transmitted by the same carrier k and OFDM symbol l of respective TX antennas thereof.

The frame building block 1020 may map the data cells of the input DPs into the OFDM symbols within a frame, and perform frequency interleaving for frequency-domain diversity.

A frame according to an embodiment of the present invention is further divided into a preamble, one or more frame signaling symbols (FSSs), normal data symbols. The preamble provides a set of basic transmission parameters for efficient transmission and reception of a signal. And the preamble indicates whether the emergency alert service (EAS) is provided in a current frame or not. A main purpose of the FSS is to carry PLS data. For fast synchronization and channel estimation, and hence fast decoding of PLS data, the FSS has a dense pilot pattern than a normal data symbol.

The frame building block 1020 may include a delay compensation block for adjusting timing between DPs and corresponding PLS data to ensure that the DPs and the corresponding PLS data are co-timed at a transmitter side, a cell mapper for mapping PLS, DPs, auxiliary streams, dummy cells, etc. to active carriers of the OFDM symbols in the frame and a frequency interleaver.

The frequency interleaver may randomly interleave data cells received from the cell mapper to provide frequency diversity. In addition, the frequency interleaver may operate on data corresponding to an OFDM symbol pair including two sequential OFDM symbols or an OFDM symbol using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

The signaling generation block 1040 may create physical layer signaling information used for an operation of each functional block. Signaling information according to an embodiment of the present invention may include PLS data. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group. The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame.

PLS2 data can include FIC_flag information. FIC (fast information channel) is a dedicated channel for carrying cross-layer information to enable fast service acquisition and channel scanning. FIC_FLAG is a 1-bit field and indicates whether the FIC is used in a current frame. If this field is set to '1', the FIC is provided in the current frame. If this field set to '0', the FIC is not carried in the current frame. The BICM block 1010 may include BICM block for protection of the PLS data including a PLS FEC encoder, a bit interleaver and a constellation mapper.

The PLS FEC encoder may include a scrambler for scrambling PLS1 data and PLS2 data, a BCH encoding/zero insertion block for outer encoding on the scrambled PLS 1,2 data using a shortened BCH code for PLS protection, and insert zero bits after BCH encoding, an LDPC encoding block for LDPC encoding using an LDPC code and an LDPC parity puncturing block. The bit interleaver may interleave each of shortened and punctured PLS1 data and PLS2 data. The constellation mapper may map the bit-interleaved PLS1 data and PLS2 data to constellations.

The broadcast signal reception apparatus for future broadcast services according to the embodiment of the present invention may correspond to the broadcast signal transmission apparatus for future broadcast services described with reference to FIG. 8.

The broadcast signal reception apparatus for future broadcast services according to the embodiment of the present invention may include a synchronization & demodulation module carrying out demodulation corresponding to a reverse procedure of a procedure performed by the broadcast signal transmission apparatus, a frame parsing module parsing input signal frames and extracting data through which a service selected by a user is transmitted, a demapping & decoding module which convert input signals into bit domain data and then deinterleave the same as necessary, perform demapping of mapping applied for transmission efficiency and correct an error generated on a transmission channel through decoding, an output processor performing reverse procedures of various compression/signal processing procedures which are applied by the broadcast signal transmission apparatus and a signaling decoding module obtaining PLS information from a signal demodulated by the synchronization & demodulation module.

The frame parsing module, the demapping & decoding module and the output processor may execute functions thereof using data output from the signaling decoding module. According to an embodiment of the present invention, each TI group is either mapped directly to one frame or spread over PI frames. Each TI group is also divided into more than one TI block ($N_{TI}$), where each TI block corresponds to one usage of a time interleaver memory. The TI blocks within the TI group may contain slightly different numbers of XFECBLOCKs. Typically, the time interleaver may also function as a buffer for DP data prior to a process of frame building.

The Time interleaving according to an embodiment of the present invention is a twisted row-column block interleaver. The twisted row-column block interleaver according to an embodiment of the present invention may column-wise wite a first XFECBLOCK into a first column of a TI memory, and a second XFECBLOCK into a next column, and so on). Then, in an interleaving array, cells are diagonal-wise read diagonal-wise from a first row (rightwards along a row beginning with a left-most column) to a last row, Nr cells are read out. Moreover, in order to achieve single-memory deinterleaving at a receiver side regardless of a number of XFECBLOCKs in a TI block the twisted row-column block interleaver may insert the virtual XFECBLOCKs into the TI memory. The virtual XFECBLOCKs must be inserted infront of other FECBLOCKS to achieve single-memory deinterleaving at a receiver side.

FIG. 9 illustrates a write operation of a time interleaver according to an embodiment of the present invention.

A left block in the figure illustrates a TI memory address array, and right blocks in the figure illustrate a write operation when two virtual FEC blocks and one virtual FEC block are inserted into heads of two contiguous TI groups, respectively.

The frequency interleaver according to the present embodiment may include an interleaving address generator for generating an interleaving address for applying corresponding data to a symbol pair.

FIG. 10 illustrates an interlaving address generator including a main pseudo-random binary sequence (PRBS) generator and a sub-PRBS generator according to each FFT mode which are included in a frequency interleavaer according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,l}=[x_{m,l,0}, \ldots, x_{m,l,p}, \ldots, x_{m,l,Ndata-1}]$ for $l=0, \ldots, N_{sym}-1$, where $x_{m,l,p}$ is the $p^{th}$ cell of the $l^{th}$ OFDM symbol in the mm frame and $N_{data}$ is the number of data cells: $N_{data}=C_{FSS}$ for the frame signaling symbol(s), $N_{data}=C_{data}$ for the normal data, and $N_{data}=C_{FES}$ for the frame edge symbol. In addition, the interleaved data cells are defined as $P_{m,l}=[v_{m,l,0}, \ldots, v_{m,l,Ndata-1}]$ for $l=0, \ldots, N_{sym}-1$.

For the OFDM symbol pair, the interleaved OFDM symbol pair is given by $v_{m,l,Hi(p)}=x_{m,l,p}$, $p=0, \ldots, N_{data}-1$, for the first OFDM symbol of each pair, $v_{m,l,p}=x_{m,l,Hi(p)}$, $p=0, \ldots, N_{data}-1$ for the second OFDM symbol of each pair, where $H_l(P)$ is the interleaving address generated based on a PRBS generator and a cyclic shift value (symbol offset) of a sub-PRBS generator.

As described above with reference to FIG. 6, a link layer is a layer between a physical layer and a network layer. And, a transmitter may receive data in the network layer and transport it to the physical layer, and then, may transmit the data to a receiver by processing it in the physical layer. A link layer processor may format input packets into a single format packet so as to be processed in the physical layer. In the present disclosure, encapsulation and compression of the link layer performed in the link layer may be performed based on ATSC Link layer Protocol (ALP), and the packets generated based on the ALP protocol may be referred to as ALP packets. The link layer processor may receive network layer data in a format such as IP data and MPEG-2 TS data, and may encapsulate it into an ALP packet.

FIG. 11 illustrates a link layer packet according to an embodiment of the present invention.

In FIG. 11, a link layer packet, that is, an ALP packet includes a base header, an additional header, an optional header and a payload. The base header may have a fixed size and the additional header may have a variable size based on the base header. The additional header and the optional header may include additional information/fields according to the payload. An ALP packet header may include the additional header based on a control field of the base header. Whether the optional header is present may be indicated by flag information included in the additional header.

FIG. 12 illustrates a structure of a link layer packet in more detail according to an embodiment of the present invention.

In FIG. 12, a base header may include at least one field of a type field, a Payload Configuration (PC) field, a header mode field in the case that the PC field value is 0, a segmentation concatenation field in the case that the PC field value is 1, or a length field.

An additional header may include at least one field of a length MSB (Len MSB) field, a Sub-stream Identifier Flag (SIF) field or a Header Extension Flag (HEF) in the case of a single packet. The additional header may include at least one field of a segment sequence number (Seg_SN) field, a Last Segment Indicator (LSI) field, an SIF field or an HEF field in the case of segmentation. The additional header may include at least one field a length MSB (Len MSB) field, a count field, a Sub-stream Identifier Flag (SIF) field or a component length field in the case of concatenation).

An optional header may include an SID field and/or a header extension field. The Sub-stream Identifier (SID) field may indicate a sub-stream identifier for an ALP packet. The SID may be used for filtering a specific packet stream in a link layer level. The SID may be existed between the additional header and the optional header.

FIG. 13 illustrates a procedure for transmitting and receiving broadcast data using an SID according to an embodiment of the present invention.

As described above, an ALP packet may include an SID. The SID may be used for filtering a specific packet stream. For example, as shown in FIG. 13, a packet stream that has a combination of the same IP address/port number may be represented as a single session. In the present disclosure, the packet stream that has a combination of the same IP address/port number may be referred to as multicast. A session may be a set of data transmitted in a network or a network layer like an IP.

A transmitter may add a separate SID for the packet stream that has a combination of the same IP address/port number, and may include the corresponding SID in a header of a link layer packet. However, in such a case, mapping information for each session and an SID should be able to be signaled. In FIG. 13, for a first session and a second session that are distinguished with IP/UDP, SIDs 0x01 and 0x02 may be allocated, respectively. A receiver may extract a PLP and may transport data included in the PLP to an IP/UDP layer such that all of the data included in the PLP are processed. However, in the case that the data corresponding to a service required in the receiver is data of session 1, the receiver performs filtering out the data of session 2, and accordingly, it decreases processing burden. Accordingly, the receiver may process only the ALP packets of session 1 of which SID is 0x01, and may transport it to the IP/UDP layer.

FIG. 14 illustrates link layer signaling information according to an embodiment of the present invention.

The service session information in FIG. 14(a) is the link layer signaling information for a receiver to receive a service. In FIG. 14(a), the service session information includes a service number (num_services) field indicating the number of services, a service ID (service_id) field and service session information. The service session information may include a source IP address (source_IP_address) field, a destination IP address (destination_IP_address) field, a destination port number (destination_port_number) field and a PLP ID field.

The service session information of FIG. 14(a) may further include signaling information of FIG. 14(b). The signaling information of FIG. 14(b) includes SID information in addition to service ID information. The receiver may combine session information for receiving a service and sub-stream mapping information, and may filter a stream for the corresponding service by using the SID field included in a link layer packet. That is, the receiver may perform a link layer filtering with the SID that corresponds to a service ID.

Hereinafter, a method for classifying a data set, that is a sub-stream of a network layer. In a broadcast system, not all of functions provided by UDP/IP protocol, but only a part of the corresponding protocol may be used. As described with reference to FIG. 6, a transmitter may perform a header compression in a link layer.

FIG. 15 illustrates an IPv4 packet header structure according to an embodiment of the present invention.

For an IPv4 packet header, the following classification may be applied.

1) A field having the same value at all times: Version (decimal number '4'), IHL (decimal number '5') and Protocol (decimal number '17'), 2) A field for calculating a corresponding value in a receiver: Total length and Header Checksum, 3) Not used field: Type of service, Identification, IP flags, Fragment Offset and Time To Live (TTL)

FIG. 16 illustrates an IPv6 packet header structure according to an embodiment of the present invention.

For an IPv6 packet header, the following classification may be applied.

1) A field having the same value at all times: Version (decimal number '6') and Next Header (decimal number '17'), 2) A field for calculating a corresponding value in a receiver: Payload length, 3) Not used field: Traffic Class, Flow Label and Hop Limit FIG. 17 illustrates a UDP packet header structure according to an embodiment of the present invention.

For a UDP packet header, the following classification may be applied.

1) A field having the same value at all times: Version (decimal number '6') and Next Header (decimal number '17'), 2) A field for calculating a corresponding value in a receiver: Length and Checksum In the classification/condition described above, when a source address and a destination address are transmitted in the case of an IP packet, and when a source port and a destination port are transmitted in the case of a UDP packet, a receiver may reconstruct IP/UDP packet. In addition, in the case that IP address/port combination used in a broadcast stream is limited, the IP address/port is indexed, and only the corresponding index information may be transmitted. In this case, transmitter/receiver should know the index and the mapping information for IP address/port in advance.

FIG. 18 illustrates mapping information for an index and IP address/port number as link layer signaling information according to an embodiment of the present invention.

FIG. 18(a) illustrates information of signaling the mapping information for an index and IP address/port number for the case that a packet type is IPv4. FIG. 18(b) illustrates information of signaling the mapping information for an index and IP address/port for the case that a packet type is IPv6.

In the case that header compression is performed under a specific condition, compression information may be mapped to an index value. In this case, in order to inform the header compression information to a receiver, a predefined mapping table should be stored in the receiver. However, in this case, the session information that may be used for a broadcast data transmission, that is, a use of IP address/port number may be restricted. Furthermore, in the case that a separate index is used for each channel and each PLP, large storage space is required in the receiver in order to store the corresponding index. Hereinafter, a method for transmitting such an index as signaling information is proposed, and particularly, a method is proposed for minimizing an occurrence of overhead owing to a use of the signaling information which is transmitted for a link layer configuration.

In FIG. 14(a), an embodiment of session information for a service is shown. A receiver should receive transmission information of a corresponding service data in order to obtain a specific service. Hereinafter, an embodiment for adding mapping information to the session information described in FIG. 14(a) is described.

FIG. 19 illustrates mapping information according to an embodiment of the present invention.

FIG. 19 relates to a case of single session in which a service is transmitted through a single session, and the mapping information of FIG. 19 may be Sub stream and Header compression Mapping (SHM) signaling information.

In FIG. 19, a Header Compression Flag (HCF) is a flag that informs whether a header compression is applied. As an embodiment, in the case that the HCP field value is 1, this represents that the header compression is applied. The HCF may be used for adding information which is not defined in the service session information among an IP address and a port number in relation to a service ID. As an embodiment, in the case that all of source/destination IP address and source/destination port number are defined in the service session information, the HCF may not be used.

When the signaling information of FIG. 19 is transmitted, a link layer processing operation of a receiver is as follows.

When a user selects a specific service, a receiver may obtain the service session information for the corresponding service ID. The receiver may obtain the service session information by parsing ALP signaling information. Accordingly, the receiver may obtain a PLP for the corresponding service ID, a source IP address, a destination IP address and a destination port number.

The receiver may obtain SHM signaling information for the corresponding service ID. The receiver may obtain a fact on whether a header compression is performed for the corresponding service ID, an SID and a source port number by parsing the SHM signaling information. The receiver may decode a PLP that corresponds to a service ID, and may filter a packet that has an SID of a reception service among the link layer packets included in the PLP. The receiver may restore IP/UDP packet header by using the IP address/port number that corresponds to the SID from the filtered packets. And the receiver may transport the IP/UDP packet in which the header is restored to a higher layer.

FIG. 20 illustrates mapping information according to an embodiment of the present invention.

FIG. 20 relates to the case of a single session in which a service is transmitted through a single session, and particularly, shows an embodiment of the case that the mapping information of FIG. 19 is included in service session information. In FIG. 20, the description for the field/information described in FIG. 19 is not repeated.

In the case that the signaling information of FIG. 20 is transmitted, a link layer processing operation of a receiver is as below.

When a user selects a specific service, a receiver may obtain service session information for the corresponding service ID. The receiver may obtain the service session information by parsing ALP signaling information. Accordingly, the receiver may obtain a PLP for the corresponding service ID, a source IP address, a destination IP address, a destination port number, a fact on whether a header compression is performed for the corresponding service ID, an SID and a source port number.

The receiver may decode the PLP that corresponds to the service ID, and may filter a packet that has an SID of a reception service among the link layer packets included in the PLP. The receiver may restore IP/UDP packet header by using the IP address/port number that corresponds to the SID from the filtered packets. And the receiver may forward the IP/UDP packet in which the header is restored to a higher layer.

Hereinafter, the case that a service is transmitted through several sessions is described. According to a session in which each service is transmitted, each SID may be mapped, and a stream transmitted through a plurality of sessions is mapped to a separate sub-stream, and a plurality of sub-stream information may be used for receiving the corresponding service.

FIG. 21 illustrates service session information according to an embodiment of the present invention.

FIG. 21 shows service session information for an embodiment in which a single service is transmitted through a plurality of sessions.

The different point from the service session information shown in FIG. 14(a) is that a service session number (num_service_session) field for a plurality of service sessions and for loop for a plurality of service sessions are added.

FIG. 22 illustrates mapping information according to an embodiment of the present invention.

FIG. 22 shows the mapping information for an embodiment in which a single service is transmitted through a plurality of sessions. The mapping information in FIG. 22 may be Sub stream and Header compression Mapping (SHM) signaling information. In relation to FIG. 22, the same description for the field description described above is not repeated.

In the case that the service session information of FIG. 21 and the SHM signaling information of FIG. 22 are used, a link layer processing operation of a receiver is as below.

When a user selects a specific service, a receiver may obtain the service session information for the corresponding service ID. The receiver may obtain the service session information by parsing ALP signaling information. The receiver may obtain a plurality of session information for a single service. Accordingly, the receiver may obtain a PLP for a plurality of sessions, a source IP address, a destination IP address and a destination port number.

The receiver may obtain SHM signaling information for the corresponding service ID. In the SHM information, a separate SID may be allocated to each session that configures a service. The receiver may obtain a fact on whether a header compression is performed for the corresponding session, an SID and a source port number by parsing the SHM signaling information. In order to allocate a separate SID to each session, a destination IP address and a port number may be additionally included in each signaling table.

The receiver may decode a PLP for a plurality of sessions, and may filter a packet that has an SID of a reception service among the link layer packets included in the PLP. The receiver may restore IP/UDP packet header by using the IP address/port number that corresponds to the SID from the filtered packets. And the receiver may forward the IP/UDP packet in which the header is restored to a higher layer.

FIG. 23 illustrates mapping information according to an embodiment of the present invention.

FIG. 23 shows the mapping information for an embodiment in which a single service is transmitted through a plurality of sessions. FIG. 23 shows an embodiment of the case that the mapping information of FIG. 22 is included in the service session information. In FIG. 23, the same description for the field/information described in FIG. 22 is not repeated.

In the case that the signaling information of FIG. 23 is transmitted, a link layer processing operation of a receiver is as below.

When a user selects a specific service, a receiver may obtain the service session information for the corresponding service ID. The receiver may obtain the service session information by parsing ALP signaling information. The receiver may obtain a plurality of session information and a corresponding SID for a single service. Accordingly, the receiver may obtain a PLP for a plurality of sessions, a source IP address, a destination IP address, a destination port number, a fact on whether a header compression is performed for the corresponding service ID, an SID and a source port number. In order to allocate a separate SID to each session, a destination IP address and a port number may be additionally included in each signaling table.

The receiver may decode a PLP for a plurality of sessions, and may filter a packet that has an SID of a reception service among the link layer packets included in the PLP. The receiver may restore IP/UDP packet header by using the IP address/port number that corresponds to the SID from the filtered packets. And the receiver may forward the IP/UDP packet in which the header is restored to a higher layer.

FIG. 24 illustrates a link layer processing of transmitter/receiver according to an embodiment of the present invention.

FIG. 24(a) shows a link layer processing of a transmitter and FIG. 24(b) shows a link layer processing of a receiver.

In FIG. 24(a), a transmitter transmits IP/UDP packet stream that corresponds to service A to session #1 and session #2. A link layer processor may encapsulate session #1 and session #2 with different link layer packets, respectively. While the transmitter performs a link layer processing, the transmitter may map SID 0x01 and SID 0x02 to session #1 and session #2, respectively, and may process a link layer packet with PLP data.

In FIG. 24(b), a receiver receives a PLP and performs a link layer processing. When a user selects service A, the receiver is not required to other data (SID=0x03, 0x04) included in a link layer. Accordingly, the receiver may check the SID that corresponds to service A from signaling information, and may filter the packet that has the corresponding SID (0x01 and 0x02) and transport it to IP/UDP layer.

FIG. 25 illustrates mapping information according to an embodiment of the present invention.

The mapping information in FIG. 25 may be Sub stream and Header compression Mapping (SHM) information.

In the case that a service is transmitted through several sessions, the service session information as shown in FIG. 21 may be transmitted. In this case, each service may be mapped to a single SID or a stream transmitted through several sessions may be mapped to a single sub-stream. In such a case, a field may be added to inform the information for a header compression additionally.

In the Sub stream and Header compression Mapping (SHM) information of FIG. 25, an HC index (HC_index) information is added to the mapping information of FIG. 22. Other description is the same as described above.

In the case that the information of FIG. 25 is used, an operation of a receiver is as below.

When a user selects a specific service, a receiver may obtain service session information for the corresponding service ID. The receiver may obtain the service session information by parsing ALP signaling information. The receiver may obtain a PLP for a plurality of sessions, a source IP address, a destination IP address and a destination port number.

The receiver may obtain SHM signaling information for the corresponding service ID. In the SHM information, a separate SID may be allocated to each session that configures a service. The receiver may obtain a fact on whether a header compression is performed for the corresponding session, an SID and a source port number by parsing the SHM signaling information. In the case that the header compression is applied, the receiver may obtain the corresponding HC_Index information and/or a source port number.

The receiver may decode a PLP for a plurality of sessions, and may filter a packet that has an SID of a reception service among the link layer packets included in the PLP. The receiver may restore IP/UDP packet header by using the HC_Index information and the IP address/port number that corresponds to the SID from the filtered packets. And the receiver may transport the IP/UDP packet in which the header is restored to a higher layer.

FIG. 26 illustrates service session information according to an embodiment of the present invention.

The service session information in FIG. 26 shows an embodiment of the case that the SHM information is included in the service session information.

In the case that the information of FIG. 26 is used, an operation of a receiver is as below.

When a user selects a specific service, a receiver may obtain service session information for the corresponding service ID. The receiver may obtain the service session information by parsing ALP signaling information. The receiver may obtain a PLP for a plurality of sessions, a source IP address, a destination IP address, a destination port number, a fact on whether a header compression is performed for the corresponding session, an SID and a source port number. In the case that the header compression is applied, the receiver may obtain the corresponding HC_Index information and/or a source port number.

The receiver may decode a PLP for a plurality of sessions, and may filter a packet that has an SID of a reception service among the link layer packets included in the PLP. The receiver may restore IP/UDP packet header by using the HC_Index information and the IP address/port number that corresponds to the SID from the filtered packets. And the receiver may transport the IP/UDP packet in which the header is restored to a higher layer.

FIG. 27 illustrates a link layer processing of transmitter/receiver according to an embodiment of the present invention.

FIG. 27(a) shows a link layer processing of a transmitter and FIG. 27(b) shows a link layer processing of a receiver.

In FIG. 27(a), a transmitter transmits IP/UDP packet stream that corresponds to service A to session #1 and session #2. A link layer processor may encapsulate session #1 and session #2 with different link layer packets, respectively. While the transmitter performs a link layer processing, the transmitter may map SID 0x01 and SID 0x02 to session #1 and session #2, respectively, and may process a link layer packet with PLP data. In addition, the transmitter may allocate a header compression index (HC_ID) when the header compression is performed.

In FIG. 27(b), a receiver receives a PLP and performs a link layer processing. When a user selects service A, the receiver is not required to other data (SID=0x03, 0x04) included in a link layer. Accordingly, the receiver may check the SID and the HC index that correspond to service A from signaling information, and may filter the packet that has the corresponding SID (0x01 and 0x02) and forward it to IP/UDP layer.

FIG. 28 illustrates link layer mapping information according to an embodiment of the present invention.

FIG. 28 may provide a mapping of a PLP and IP/UDP, that is, a link mapping of an upper layer and a physical layer. The information of FIG. 28 may be referred to as sub stream mapping information, link layer mapping information or link mapping information. The information of FIG. 28 may be added to the service session information described above.

The mapping information of FIG. 28 includes PLP number (num_PLP) information, and includes PLP ID information with respect to the included PLPs and IP address/port number information mapped to the corresponding PLP ID.

The mapping information of FIG. 28 includes number information (num_sub_stream) of sub stream, that is, a session included in a PLP. And, with respect to each sub stream, SID information, source IP address (Src_address) information, destination IP address (Dest_address) information, source port (Src_port) information and destination port (Dest_port) information.

As shown in FIG. 28, the sub stream included in a PLP may be identified by the source IP address (Src_address) information, the destination IP address (Dest_address) information, the source port (Src_port) information and the destination port (Dest_port) information. Furthermore, such a sub stream may be identified by an SID.

A receiver may filter a stream for a service by using a combination of upper layer session information and sub stream mapping information for receiving the service and the SID field included in a link layer packet.

Hereinafter, in FIG. 29 to FIG. 32, it is described a signaling structure that indicates each PLP and an SID included in the corresponding PLP and an operational structure of transmitter/receiver for the structure.

FIG. 29 illustrates an operational structure of a transmitter according to an embodiment of the present invention.

In IP/UDP network layer, an IP/UDP session which is group/set of IP/UDP data for a specific service may be identified by an IP address and/or a UDP port. A link layer of the transmitter may map an IP/UDP session to a PLP, and may provide the mapping information as shown in FIG. 28.

The transmitter may perform a sub stream mapping to a session. That is, the transmitter may allocate a sub stream ID (SID) to a specific session. The mapping between a sub stream and a session may be provided through sub stream mapping information as an SID. Furthermore, the session to which the SID is allocated is encapsulated in a link layer and transported to a PLP.

In the case that an IP stream which is going to be transmitted to each PLP is multiplexed and transported to a link layer, the transmitter may generate the corresponding session information (a source IP address, a destination IP address, a source port number and a destination port number), a PLP ID and the information mapped to an SID as signaling, and may encapsulate and transport it as a link layer signaling packet.

FIG. 30 illustrates an operational structure of a receiver according to an embodiment of the present invention.

The embodiment of FIG. 30 shows the case of receiving data by obtaining path information of a service that is going to be received through a signaling like a service list table at one time.

When a user selects a specific service, a receiver may obtain PLP information that is going to be received through a signaling like a service list table for the corresponding service. The receiver may obtain service session information (a PLP, a source IP address, a destination IP address and a destination port number) through the a service list table. The receiver may receive a link layer packet from a decoded PLP and may obtain signaling information (e.g., sub stream mapping information) in which SID information is included. The receiver may obtain mapping relation information between an SID and session information/data by using the mapping information.

The receiver may identify an SID for an IP address and a port number of a service to be received. A link layer processor of the receiver may filter only the packet for the corresponding SID and transport it to a higher layer, that is, IP/UDP layer, and may not process the packets that have remaining SIDs. A higher layer processor of the receiver may process the received IP/UDP packets and provide a selected service.

FIG. 31 illustrates an operational structure of a receiver according to another embodiment of the present invention.

The embodiment of FIG. 31 shows the case of receiving data by obtaining path information of a service that is going to be received through a signaling like a service list table, and obtaining additional signaling (e.g., service layer signaling), and receiving data for another path.

When a user selects a specific service, a receiver may obtain PLP information and session information that are going to be received through a signaling like a service list table for the corresponding service. The receiver may obtain service session information (a PLP, a source IP address, a destination IP address and a destination port number) through the a service list table. The receiver may receive a link layer packet from a decoded PLP and may obtain signaling information (e.g., sub stream mapping information) in which SID information is included. The receiver may obtain mapping relation information between an SID and session information/data by using the mapping information. The receiver may identify an SID for an IP address and a port number of a service to be received. A link layer processor of the receiver may filter only the packet for the corresponding SID and transport it to a higher layer, that is, IP/UDP layer, and may not process the packets that have remaining SIDs.

The receiver may obtain a signaling (e.g., service layer signaling) in which there is path information for other data to receive among the received data, and may obtain PLP information and session information to be additionally received. Furthermore, the receiver may receive a link layer packet from the PLP which is additionally decoded, and may obtain the signaling (e.g., service layer signaling) in which SID information is included. Even in this case, the receiver may identify an SID for an IP address and a port number of a service to be received, and may filter only the packet for the corresponding SID and transport it to a higher layer, that is, IP/UDP layer.

A higher layer process of the receiver may process the received IP/UDP packets and provide a selected service.

FIG. 32 illustrates mapping information according to an embodiment of the present invention.

As an embodiment, the sub stream mapping information shown in FIG. 32 may be forwarded through each PLP. Since separate table is transmitted to each PLP, it may be considered that the PLP in which a table is included and the PLP in which data is included may have the same PLP_ID.

Hereinafter, in FIG. 33 to FIG. 35, it is described a signaling structure in which SID information that corresponds to each PLP is transmitted to separate signaling PLP and signaling PLP indicates an SID of several PLPs, and an operational structure of transmitter/receiver for the structure.

FIG. 33 illustrates an operational structure of a transmitter according to an embodiment of the present invention.

In IP/UDP network layer, an IP/UDP session which is group/set of IP/UDP data for a specific service may be identified by an IP address and/or a UDP port. A link layer of the transmitter may map an IP/UDP session to a PLP, and may provide the mapping information as shown in FIG. 33.

The transmitter may perform a sub stream mapping to a session. That is, the transmitter may allocate a sub stream ID (SID) to a specific session. The mapping between a sub stream and a session may be provided through sub stream mapping information as an SID. Furthermore, the session to which the SID is allocated is encapsulated in a link layer and transport to a PLP.

In the case that an IP stream which is going to be transmitted to each PLP is multiplexed and forwarded to a link layer, the transmitter may generate the corresponding session information (a source IP address, a destination IP address, a source port number and a destination port number), a PLP ID and the information mapped to an SID as signaling, and may encapsulate and transport it as a link layer signaling packet. Particularly, FIG. 33 shows an embodiment that a link layer signaling packet for a plurality of PLPs (PLP1 to PLPM) is not included in each PLP, but included in a specific PLP (signaling PLP).

FIG. 34 illustrates an operational structure of a receiver according to an embodiment of the present invention.

The embodiment of FIG. 34 shows the case of receiving data by obtaining path information of a service that is going to be received through a signaling like a service list table at one time.

When a user selects a specific service, a receiver may obtain PLP information that is going to be received through a signaling like a service list table for the corresponding service. The receiver may obtain service session information (a PLP, a source IP address, a destination IP address and a destination port number) through the a service list table. The receiver may receive a link layer packet from a decoded PLP or other specific PLP (signaling PLP or common PLP) and may obtain signaling information (e.g., sub stream mapping information) in which SID information for all PLPs is included. The receiver may obtain mapping relation information between an SID and session information/data by using the mapping information.

The receiver may identify an SID for an IP address and a port number of a service to be received. A link layer processor of the receiver may filter only the packet for the corresponding SID and forward it to a higher layer, that is, IP/UDP layer, and may not process the packets that have remaining SIDs. A higher layer processor of the receiver may process the received IP/UDP packets and provide a selected service.

FIG. 35 illustrates an operational structure of a receiver according to another embodiment of the present invention.

The embodiment of FIG. 35 shows the case of receiving data by obtaining path information of a service that is going to be received through a signaling like a service list table, and obtaining additional signaling (e.g., service layer signaling), and receiving data for another path.

When a user selects a specific service, a receiver may obtain PLP information and session information that are going to be received through a signaling like a service list table for the corresponding service. The receiver may obtain service session information (a PLP, a source IP address, a destination IP address and a destination port number) through the a service list table. The receiver may receive a link layer packet from a decoded PLP or other specific PLP (signaling PLP or common PLP) and may obtain signaling information (e.g., sub stream mapping information) in which SID information for all PLPs is included.

The receiver may obtain mapping relation information between an SID and session information/data by using the mapping information. The receiver may identify an SID for an IP address and a port number of a service to be received. A link layer processor of the receiver may filter only the packet for the corresponding SID and transport it to a higher layer, that is, IP/UDP layer, and may not process the packets that have remaining SIDs.

The receiver may obtain a signaling (e.g., service layer signaling) in which there is path information for other data to receive among the received data, and may obtain PLP information and session information to be additionally received. Furthermore, the receiver may receive a link layer packet from the PLP which is additionally decoded, and may obtain the signaling (e.g., service layer signaling) in which SID information is included. Even in this case, the receiver may identify an SID for an IP address and a port number of a service to be received, and may filter only the packet for the corresponding SID and transport it to a higher layer, that is, IP/UDP layer.

A higher layer processor of the receiver may process the received IP/UDP packets and provide a selected service.

As an embodiment, the sub stream mapping information as shown in FIG. 28 may be forwarded through a signaling PLP or a common PLP. In order to signal the SID for each PLP, the SID information may be provided for each PLP_ID. In the present disclosure, signaling PLP indicates a PLP that includes signaling information.

Hereinafter, a header compression method of a link layer described above is described in more detail.

RoHC-U scheme may be used for an IP header compression in a link layer. As an embodiment, profile 0x02 of RoHC-U may be applied to a broadcast system of the present invention. The link layer header compression of the present invention may further include an adaptation procedure of an adaptation module. A link layer processor may include an RoHC module and the adaptation module, and an encapsulator.

The adaptation module may extract context information from an RoHC packet stream. The context information may include at least one of a static chain and a dynamic chain. The adaptation module may convert an IR packet and/or an IR-DYN packet into a compressed packet. In addition, the adaptation module may generate signaling information for RoHC-U compression, and the signaling information may be transmitted as link layer signaling information.

An advantage of the adaptation module is the fact that fast packet stream detection is available. Particularly, in relation to a channel change, packet stream detection becomes faster. A receiver is not required to wait for detection of an IR packet in an original RoHC decompressor. The receiver may detect signaling information and release compression of a packet stream in any time. For a stable IP stream, a period of an IR packet generation may be elongated. However, a signaling PLP should be transmitted in more robustly than a data PLP. An RoHC compressor may also be referred to as an IP header compressor or a header compressor.

Adaptation may be applied as a plurality of modes.

FIG. 36 illustrates an IP header compression of a first adaptation mode according to an embodiment of the present invention.

A first adaptation mode represents a mode in which an adaptation operation is skipped during a header compression procedure of an IP stream.

A link layer processor of a transmitter performs an IP header compression of a reception IP stream. An RoHC module may compress an IP/UDP packet and may output an IR packet, an IR-DYN packet and a compressed packet. In the first adaptation mode, an adaptation module may bypass the received packets, not extract context information from the received IR packet and IR-DYN packet. And, the link layer processor may encapsulate the received packet into an ALP packet. A packet type value of the encapsulated packets may be a value indicating a compressed IP packet.

FIG. 37 illustrates a transmission operation of a first adaptation mode according to an embodiment of the present invention.

In FIG. 37, an RoHC compressor may initialize a context for an initial IP packet, and may generate an IR packet. In addition, when a context is updated, the RoHC compressor generates an IR-DYN packet. A static context is kept until the next IP packet is generated. A dynamic context is kept until the next IR packet or an IR-DYN packet is generated. In a first adaptation mode, packet conversion and context extraction are not occurred.

FIG. 38 illustrates a reception operation of a first adaptation mode according to an embodiment of the present invention.

In FIG. 38, a RoHC decompressor receives a packet stream. The RoHC decompressor may decompress subsequent packets only in the case that there is an IR packet. Accordingly, all packets before the IP packet is decompressed are discarded.

FIG. 39 illustrates an IP header compression of a second adaptation mode according to an embodiment of the present invention.

In a second adaption mode, an adaptation module may convert an IR packet into an IR-DYN packet by extracting context information in the IR packet.

A link layer processor of a transmitter performs an IP header compression of a reception IP stream. An RoHC module may compress an IP/UDP packet and may output an IR packet, an IR-DYN packet and a compressed packet. In the second adaptation mode, an adaptation module extracts context information from the received IR packet, and converts the IP packet into an IR-DYN packet. And, the link layer processor may encapsulate the received packet into an ALP packet.

The extracted context information may be transmitted by a link layer signaling. And, such context information may be encapsulated into a packet which is separate from a data part. A packet type value of packets of which context information is encapsulated may be a value indicating a link layer signaling packet. On the other hand, a packet type value of other encapsulated packets may be a value indicating a compressed IP packet.

FIG. 40 illustrates a transmission operation of a second adaptation mode according to an embodiment of the present invention.

In FIG. 40, an RoHC compressor may initialize a context for an initial IP packet, and may generate an IR packet. In addition, when a context is updated, the RoHC compressor generates an IR-DYN packet. A static context is kept until the next IP packet is generated. A dynamic context is kept until the next IR packet or an IR-DYN packet is generated.

In a second adaptation mode of FIG. 40, an adaptation module may extract context information including a static chain from an IR packet, and may convert the IP packet into an IR dynamic packet.

FIG. 41 illustrates a reception operation of a second adaptation mode according to an embodiment of the present invention.

In FIG. 41, an adaptation module receives a packet stream. A receiver may obtain static context information by processing a signaling PLP. The obtainment of the context information may also be performed before a processing of a data PLP or a packet stream. The adaptation module may convert a detected IR-DYN packet into an IR packet by using the static context information.

RoHC decompressor/RoHC-U module receive a packet stream. The RoHC decompressor may decompress subsequent packets only in the case that there is an IR packet. The RoHC decompressor may decompress the packets following the IR packet converted in the adaptation module.

In a second adaptation mode of FIG. 41, an interval between an initial reception and a packet decompressing is reduced, and accordingly, discarded packets are also reduced. This is because decompressing is able to be started by converting an IR-DYN packet into an IR packet by using context information only in the case that an IR-DYN packet is discovered, even before an initial IR packet is discovered, in the second adaptation mode. However, even in the case of the second adaptation mode, latency may occur until reception/discovery of an IR-DYN packet.

All RoHC packets may include a sequence number. By using the sequence number, a context and a compressed packet may be combined. The second adaptation mode may be suitable for an IP stream which is dynamically converted.

FIG. 42 illustrates an IP header compression of a third adaptation mode according to an embodiment of the present invention.

In a third adaption mode, an adaptation module may convert an IR packet and an IR-DYN packet into compressed packets by extracting context information in the IR packet and the IR-DYN packet. A link layer processor may include an RoHC module, an adaptation module and an encapsulator.

A link layer processor of a transmitter performs an IP header compression of a reception IP stream. An RoHC module may compress an IP/UDP packet and may output an IR packet, an IR-DYN packet and a compressed packet. In the third adaptation mode, an adaptation module converts an IR packet and an IR-DYN packet into compressed packets by extracting context information from the received IR packet and IR-DYN packet. And, the link layer processor may encapsulate the received packet into an ALP packet.

The extracted context information may be transmitted by a link layer signaling. And, such context information may be encapsulated into a packet which is separate from a data part. A packet type value of packets of which context information is encapsulated may be a value indicating a link layer signaling packet. On the other hand, a packet type value of other encapsulated packets may be a value indicating a compressed IP packet.

FIG. 43 illustrates a transmission operation of a third adaptation mode according to an embodiment of the present invention.

In FIG. 43, an RoHC compressor may initialize a context for an initial IP packet, and may generate an IR packet. In addition, when a context is updated, the RoHC compressor generates an IR-DYN packet. A static context is kept until the next IP packet is generated. A dynamic context is kept until the next IR packet or an IR-DYN packet is generated.

In a third adaptation mode of FIG. 43, an adaptation module may extract context information including a static chain from an IR packet, and may extract context information including a dynamic chain from an IR-DYN packet. And, the adaptation module may convert the IP packet and the IR-DYN packet into compressed packets.

FIG. 44 illustrates a reception operation of a second adaptation mode according to an embodiment of the present invention.

In FIG. 44, an adaptation module receives a packet stream. A receiver may obtain context information by processing a signaling PLP. The obtainment of the context information may also be performed before a processing of a data PLP or a packet stream. The adaptation module may convert the compressed packet into an IR packet by using the context information. In addition, the adaptation module may convert the compressed packet into an IR-DYN packet by using the context information. When the compressed packet is converted into an IR packet, a static chain may be used, and when the compressed packet is converted into an IR-DYN packet, a dynamic chain may be used.

RoHC decompressor/RoHC-U module receive a packet stream. The RoHC decompressor may decompress subsequent packets only in the case that there is an IR packet. The RoHC decompressor may decompress the packets following the IR packet converted in the adaptation module.

In a second adaptation mode of FIG. 44, an interval between an initial reception and a packet decompressing is reduced, and accordingly, discarded packets are also reduced. This is because decompressing is able to be started by converting an arbitrary reception packet into an IR packet by using context information, in the second adaptation mode.

All RoHC packets may include a sequence number. By using the sequence number, a context and a compressed packet may be combined. In a third adaptation mode, by using context information, fast decompressing may be performed for any compressed packet. When a static IP stream is compressed, an IR packet and an IR dynamic packet are not frequently generated. Accordingly, the third adaptation mode may be suitable for a static IP stream.

In the case of the first adaptation mode, an adaptation is bypassed and additional signaling is not generated. Accordingly, a simple operation is available. However, a receiver is needed to detect an IR packet for a decompression. It may be preferable that the first adaptation mode is used for a stable IP stream in which an IP packet is not frequently generated.

In the case of the second adaptation mode, an adaptation module is needed to convert an IR packet into an IR-DYN packet, and a static context should be signaled. Accordingly, a dynamic operation is available. A receiver should detect an IR-DYN packet for a decompression. It may be preferable that the second adaptation mode is used for a stable IP stream in which an IR DYN packet is not frequently generated. Since a context is frequently changed, a decompressor should frequently update context information.

In the case of the third adaptation mode, an adaptation module is needed to convert an IR packet and an IR-DYN packet into a compressed packet, and static and dynamic context should be signaled. Accordingly, fast decompression start is available. However, in the third mode, an amount of signaling information may be increased in comparison with the other modes. It may preferable that the third adaptation mode is applied to a static IP stream.

FIG. 45 illustrates RoHC-U Description Table (RDT) information according to an embodiment of the present invention.

FIG. 45 shows an embodiment of signaling information that transmits context information which is generated according to an operation of an adaptation module. The RDT information of FIG. 45 includes at least one of static chain information or dynamic chain information.

In FIG. 45, a PLP ID field may be used in the case that all types of context signaling is transmitted through the same PLP. A context ID field may be applied to a multiple IP stream. A context profile (context profile) field may be omitted in the case that there is a single profile.

A dynamic chain presence (dynamic_chain_present) field may indicate whether this table includes a dynamic chain. That is, this field may indicate whether the third adaption mode is applied.

A sequence number (sequence_number) field may be used for synchronizing between context information and a compressed packet. That is, this field may be used for the case that the third adaption mode is applied.

A static chain byte field and a dynamic chain byte field are as defined in the standard in relation to ROHC compression (RFC 3095).

FIG. 46 illustrates a broadcast signal transmitter and a broadcast signal receiver according to an embodiment of the present invention.

A broadcast signal transmitter 46100 includes a link layer processor 46110 and a physical layer processor 46120.

The link layer processor 46110 may perform a link layer processing of IP/UDP data. The link layer processor may further include a header compressing module, an adaptation module and an encapsulating module. The link layer processor 46100 may perform the link layer processing described in relation to FIG. 6 to FIG. 7 and FIG. 11 to FIG. 45.

The physical layer processor 46120 may perform a physical layer processing of a link layer packet based on a PLP. The physical layer processor 46120 may perform the physical layer processing described in relation to FIG. 8 to FIG. 10.

A broadcast signal receiver 46200 includes a receiver side link layer processor 46210 and a physical layer processor 46220.

The receiver side physical layer processor 46220 may obtain signaling information by processing a PLP includes signaling information. In addition, the physical layer processor 46220 may obtain a link layer packet by processing a PLP that corresponds to a service based on the signaling information. The receiver side physical layer processor 46220 may perform an operation that corresponds to an inverse process of the transmitter side physical layer processor 46120.

The receiver side link layer processor 46210 may receive a link layer packet from a processed PLP, and may reconstruct IP/UDP data by processing the link layer packet. The receiver side link layer processor 46210 may perform an operation that corresponds to an inverse process of the transmitter side link layer processor 46110. The operation of the receiver side link layer processor 46210 is as described in relation to FIG. 6 to FIG. 7 and FIG. 11 to FIG. 45.

FIG. 47 illustrates a broadcast signal transmission method according to an embodiment of the present invention.

A broadcast transmitter may perform a link layer processing of IP/UDP data (step, S47010). The broadcast transmitter may link layer processing IP/UDP data to output a link layer packet. The broadcast transmitter may encapsulate IP/UDP data and link layer signaling information into a separate link layer packet. In the present disclosure, IP/UDP data and IP/UDP stream may also be referred to IP data and IP sub stream, respectively.

The broadcast transmitter may perform a physical layer processing of a link layer packet based on a PLP (step, S47020). The physical layer processing operation using a physical layer processor of the broadcast transmitter is as described in relation to FIG. 8 above.

A link layer packet may include at least one of a base header, an additional header, an optional header or a payload. The optional header may include Sub-stream ID (SID) information that identifies a specific IP/UDP sub-stream included in a link layer packet. The specific IP/UDP sub-stream represents a specific data set identified in IP/UDP network layer, and an IP/UDP sub-stream may be identified by a source IP address information, destination IP address information, source UDP port information and destination UDP port information. An additional header of a link layer packet may include flag information that indicates whether SID information is included in an optional header.

The link layer signaling information includes mapping information for a PLP and IP/UDP data carried in a PLP. The mapping information includes PLP number information, IP/UDP sub-stream number information included in a PLP, source IP address information for each IP/UDP sub-stream, destination IP address information, source UDP port information, destination UDP port information and SID information for IP/UDP sub-stream. The SID information may be used for filtering IP/UDP sub-stream included in a PLP in a link layer level.

The link layer processing step may further include step of compressing an IP header of an IP/UDP packet and generating at least one of an IR packet, an IR-DYN packet or a compressed packet and adapting step for selectively converting compressed IP/UDP packet. The adaptation step may operate in a plurality of operational modes. The operational mode of the adaptation step includes the first adaptation mode in which an IR packet, an IR-DYN packet and a compressed packet are bypassed, the second adaptation mode in which context information of an IR packet is extracted and an IR packet is converted into the IR-DYN packet and the third adaptation mode in which context information of an IR packet and an IR-DYN packet is extracted and the IR packet and the IR-DYN packet are converted into a compressed packet.

The link layer signaling information includes description information for such an IP header compression. The description information may include context information which is extracted in the adaptation step.

The link layer signaling packet may be included in a PLP that forwards a service list table. The service list table is signaling information that describes a service as described above in relation to FIG. 3.

According to the present invention, an ID is added for identifying data of IP/UDP layer, that is, a sub-stream in a link layer and signaled, and accordingly, a waste of processing may be prevented, which decodes all of unnecessary data in a receiver side. Particularly, such a signaling is supported in a unit of PLP, and a link layer processing may be performed in accordance with a physical layer processing. It may be signaled whether there is an SID in an additional header such that the SID may be added in a link layer packet header as occasion demands.

According to the present invention, an adaptation may be performed in a packet of which header is compressed. Context information is extracted and separately signaled through the adaptation, and accordingly, even in the case of abrupt change like a channel change, a receiver may process data with smaller delay. However, signaling overhead may be increased, and adaptation mode may be differently applied according to the type of data in which context information is generated. That is, for static IP/UDP data of which context information is small originally, the third adaption mode may be applied. For IP/UDP data which is dynamically changed, the second adaptation mode may be applied. On the other hand, in the case that there are enough channels and processing performance is good, the third adaptation may be used, and in the case that there is not enough channels, the first adaption mode may be used.

The link layer signaling information may be included in a PLP that forwards a service list table. Accordingly, a receiver side physical layer processer is able to obtain link layer signaling information while parsing a PLP that includes the service list table, a receiver side processing time may be reduced.

The steps described in the aforementioned embodiments can be performed by hardware/processors. Modules/blocks/units described in the above embodiments can operate as hardware/processors. In addition, the methods proposed by the present invention can be executed as a code. Such code can be written on a processor-readable storage medium and thus can be read by a processor provided by an apparatus.

While the embodiments have been described with reference to respective drawings for convenience, the embodiments may be combined to implement a new embodiment. The apparatus and method according to the present invention are not limited to the configurations and methods of the above-described embodiments and the whole or some of the embodiments may be selectively combined to obtain various modifications.

Meanwhile, the method proposed in the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and an implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Those skilled in the art will appreciate that the present invention may be changed and modified in various ways without departing from the spirit and essential characteristics of the present invention. Therefore, the present invention is intended to include change and modification of the present invention provided in the accompanying claims and the equivalency range.

In the specification, both the apparatus invention and the method invention are mentioned, and description of both the apparatus invention and the method invention can be applied complementarily.

MODE FOR INVENTION

Various embodiments have been described in the Best Mode for the Invention.

INDUSTRIAL APPLICABILITY

The present invention is used in a series of broadcast signal transmission/reception fields.

Those skilled in the art will appreciate that the present invention may be changed and modified in various ways without departing from the spirit and essential characteristics of the present invention. Therefore, the present invention is intended to include change and modification of the present invention provided in the accompanying claims and the equivalency range.

The invention claimed is:

1. A method for transmitting a broadcast signal in a transmitter, comprising:
   link layer processing IP (Internet Protocol) data to output at least one link layer packet,
   wherein the at least one link layer packet includes a payload, at least one of a base header, an additional header or an optional header having SID (Sub-stream Identifier) for indicating a sub-stream identifier for the at least one link layer packet; and
   physical layer processing the at least one link layer packet based on a PLP (Physical Layer Pipe),
   wherein the link layer processing includes:
      compressing a header of the IP data, and
      performing an adaptation function for the IP data based on three adaptation modes,
      wherein the three adaptation modes includes:
         a first adaptation mode in which a first IR (Initialization and Refresh) packet, a first IR-DYN (IR Dynamic) packet and a first compressed packet are bypassed,
         a second adaptation mode in which context information of a second IR packet is extracted, and the second IR packet is converted into a second IR-DYN packet, and
         a third adaptation mode in which context information of a third IR packet is extracted, context information of a third IR-DYN packet is extracted, the third IR packet is converted into a second compressed packet, and the third IR-DYN packet is converted into a third compressed packet.

2. The method for transmitting a broadcast signal of claim 1, wherein link layer signaling information includes mapping information for the PLP and the IP data carried in the PLP,
   wherein the mapping information includes PLP number information, IP/UDP (User Datagram Protocol) sub-stream number information included in the PLP, source IP address information for each IP/UDP sub-stream, destination IP address information, source UDP port information and destination UDP port information, and
wherein the SID is used for filtering the IP/UDP substream included in the PLP in a link layer level.

3. The method for transmitting a broadcast signal of claim 2, wherein additional header of the link layer packet includes flag information indicating whether the SID is included in the optional header.

4. The method for transmitting a broadcast signal of claim 3, wherein the link layer signaling information includes description information for the IP header compression, and
wherein the description information includes the extracted context information.

5. The method for transmitting a broadcast signal of claim 4, wherein a link layer signaling packet is included in the PLP forwarding a service list table, and the service list table is signaling information describing a service.

6. A broadcast signal transmitter, comprising:
a link layer processor configured to link layer process IP (Internet Protocol) data to output at least one link layer packet,
wherein the at least one link layer packet includes a payload, at least one of a base header, an additional header or an optional header having SID (Sub-stream Identifier) for indicating a sub-stream identifier for the at least one link layer packet; and
a physical layer processor configured to physical layer process the at least one link layer packet based on a PLP (Physical Layer Pipe),
wherein the link layer processor is configured to:
compress a header of the IP data, and
perform an adaptation function for the IP data based on three adaptation modes,
wherein the three adaptation modes includes:
a first adaptation mode in which a first IR (Initialization and Refresh) packet, a first IR-DYN (IR Dynamic) packet and a first compressed packet are bypassed,
a second adaptation mode in which context information of a second IR packet is extracted, and the second IR packet is converted into a second IR-DYN packet, and
a third adaptation mode in which context information of a third IR packet is extracted, context information of a third IR-DYN packet is extracted, the third IR packet is converted into a second compressed packet, and the third IR-DYN packet is converted into a third compressed packet.

7. The broadcast signal transmitter of claim 6, wherein the link layer signaling information includes mapping information for the PLP and IP/UDP the IP data carried in the PLP,
wherein the mapping information includes PLP number information, IP/UDP (User Datagram Protocol) substream number information included in the PLP, source IP address information for each IP/UDP sub-stream, destination IP address information, source UDP port information and destination UDP port information, and
wherein SID is used for filtering the IP/UDP sub-stream included in the PLP in a link layer level.

8. The broadcast signal transmitter of claim 7, wherein additional header of the link layer packet includes flag information indicating whether the SID is included in the optional header.

9. The broadcast signal transmitter of claim 8, wherein the link layer signaling information includes description information for the IP header compression, and
wherein the description information includes the extracted context information.

10. The broadcast signal transmitter of claim 9, wherein the link layer signaling packet is included in the PLP forwarding a service list table, and the service list table is signaling information describing a service.

* * * * *